United States Patent
Feng et al.

(10) Patent No.: US 11,574,187 B2
(45) Date of Patent: Feb. 7, 2023

(54) PEDESTRIAN ATTRIBUTE IDENTIFICATION AND POSITIONING METHOD AND CONVOLUTIONAL NEURAL NETWORK SYSTEM

(71) Applicants: Huawei Technologies Co., Ltd., Shenzhen (CN); INSTITUTE OF AUTOMATION, CHINESE ACADEMY OF SCIENCES, Beijing (CN)

(72) Inventors: Bailan Feng, Beijing (CN); Chunfeng Yao, Beijing (CN); Kaiqi Huang, Beijing (CN); Zhang Zhang, Beijing (CN); Yang Zhou, Beijing (CN)

(73) Assignees: Huawei Technologies Co., Ltd., Shenzhen (CN); Institute of Automation, Chinese Academy of Sciences, Beijing (CN)

( * ) Notice: Subject to any disclaimer, the term of this patent is extended or adjusted under 35 U.S.C. 154(b) by 398 days.

(21) Appl. No.: 16/809,270

(22) Filed: Mar. 4, 2020

(65) Prior Publication Data
US 2020/0272902 A1 Aug. 27, 2020

Related U.S. Application Data

(63) Continuation of application No. PCT/CN2017/100430, filed on Sep. 4, 2017.

(51) Int. Cl.
*G06N 3/08* (2006.01)
*G06F 9/54* (2006.01)
(Continued)

(52) U.S. Cl.
CPC .............. *G06N 3/08* (2013.01); *G06F 9/545* (2013.01); *G06K 9/6232* (2013.01);
(Continued)

(58) Field of Classification Search
None
See application file for complete search history.

(56) References Cited

U.S. PATENT DOCUMENTS 9,015,093 B1 *   4/2015  Commons ............. B60W 30/00
                                                 706/26
9,672,634 B2 *   6/2017  Luczak ................. G06V 20/52
(Continued)

FOREIGN PATENT DOCUMENTS

| CN | 105956560 A | 9/2016 |
| CN | 106845415 A | 6/2017 |
| CN | 106960243 A | 7/2017 |

OTHER PUBLICATIONS

Liu et al., "Deep Learning Face Attributes in the Wild," 2015 IEEE International Conference on Computer Vision, pp. 3730-3738, Institute of Electrical and Electronics Engineers, New York, New York (2015).

*Primary Examiner* — Santiago Garcia
(74) *Attorney, Agent, or Firm* — Leydig, Voit & Mayer, Ltd.

(57) ABSTRACT

A method for pedestrian attribute identification and positioning is provided. The method includes: performing feature extraction on a to-be-detected image at a plurality of different abstraction degrees, to obtain a plurality of first feature maps of a pedestrian attribute; performing convolution on the plurality of first feature maps, to obtain a plurality of second feature maps; mapping each second feature map to a plurality of areas (bins) that overlap each other, and performing max pooling on each bin, to obtain a plurality of high-dimensional feature vectors, where the plurality of bins that overlap each other evenly cover each second feature map; processing the plurality of high-dimensional feature vectors into a low-dimensional vector, to obtain an identification result of the pedestrian attribute; and further obtain-
(Continued)

ing a positioning result of the pedestrian attribute based on the plurality of second feature maps and the plurality of high-dimensional feature vectors.

18 Claims, 10 Drawing Sheets

(51) Int. Cl.
*G06K 9/62* (2022.01)
*G08G 1/005* (2006.01)
*G06V 30/262* (2022.01)

(52) U.S. Cl.
CPC ......... *G06K 9/6269* (2013.01); *G06V 30/274* (2022.01); *G08G 1/005* (2013.01)

(56) References Cited

U.S. PATENT DOCUMENTS

| | | | |
|---|---|---|---|
| 2013/0301911 A1* | 11/2013 | Rong | G06V 40/103 382/160 |
| 2014/0334719 A1* | 11/2014 | Takenaka | G06V 40/103 382/197 |
| 2016/0086057 A1* | 3/2016 | Kozakaya | G06K 9/6223 382/159 |
| 2017/0083796 A1* | 3/2017 | Kim | G06V 10/82 |
| 2018/0075290 A1* | 3/2018 | Chen | G06V 40/168 |
| 2018/0211117 A1* | 7/2018 | Ratti | G06N 3/084 |
| 2019/0213887 A1* | 7/2019 | Kitayama | G08G 1/16 |

* cited by examiner

PEDESTRIAN ATTRIBUTE IDENTIFICATION AND POSITIONING METHOD AND CONVOLUTIONAL NEURAL NETWORK SYSTEM

CROSS-REFERENCE TO RELATED APPLICATIONS

This application is a continuation of International Application No. PCT/CN2017/100430, filed on Sep. 4, 2017, the disclosure of which is hereby incorporated by reference in its entirety.

TECHNICAL FIELD

Embodiments of this application relate to the field of image surveillance technologies, and in particular, to a pedestrian attribute identification and positioning method and a convolutional neural network system.

BACKGROUND

With continuous development of hardware technologies, a computing capability of computers constantly achieves breakthroughs, and fields such as artificial intelligence, computer vision, and machine learning are accordingly advancing rapidly. However, a main problem faced by the computer vision is rooted in visual information processing manners of human and a computer. Human mainly processes the information in semantic space while the computer needs to process the information in data space. Therefore, how to bridge a semantic gap from image space to the semantic space is a problem that computer vision researchers are trying to resolve. A visual attribute includes some basic semantic information that can be used to describe a visual object and has good universality. In addition, inspired by a human visual perception system, attribute-based semantic representation is a relatively intuitive and natural method for describing a visible object. In a video surveillance system, the visual attribute has a great application potential for identifying pedestrian attributes such as "gender", "wearing glasses" and "suit type". For different research backgrounds and application targets, there are many visual attribute identification tasks, for example, general object classification based on low-layer attribute identification, face verification based on face attribute identification, and pedestrian attribute identification from a customer picture. However, identification and positioning for parsing a pedestrian attribute in the surveillance scenario is still in a primary stage. In the video surveillance scenario, it is difficult to properly identify and position a pedestrian attribute due to adverse factors such as relatively low image resolution, a long shooting distance, a change of a pedestrian posture caused by different shooting angles, and a block easily caused by an environmental object or a pedestrian appendage to a pedestrian attribute.

SUMMARY

Embodiments of the present invention disclose a pedestrian attribute identification and positioning method and a convolutional neural network system, so as to overcome an adverse factor in a video surveillance scenario, and better identify and position a pedestrian attribute.

According to a first aspect, an embodiment of the present invention provides a pedestrian attribute identification and positioning method, where the method is applied to a convolutional neural network system. The method includes: obtaining, by the convolutional neural network system, a to-be-detected image; performing feature extraction on the to-be-detected image at a plurality of different abstraction degrees, to obtain a plurality of first feature maps of a pedestrian attribute, where these feature maps may be referred to as general features of the pedestrian attribute (or referred to as general feature diagrams of the pedestrian attribute); performing convolution on the plurality of first feature maps, to obtain a plurality of second feature maps, where the new feature map may be referred to as a middle-layer feature of the pedestrian attribute (or referred to as a middle-layer feature diagram of the pedestrian attribute); mapping each of the plurality of second feature maps to a plurality of areas (bins) that overlap each other, and performing max pooling on each bin, to obtain a plurality of high-dimensional feature vectors, where the plurality of bins that overlap each other evenly and completely cover each second feature map; integrating and regressing the plurality of high-dimensional feature vectors into a low-dimensional vector, to obtain an identification result of the pedestrian attribute; obtaining a positioning result of the pedestrian attribute based on the plurality of second feature maps and the plurality of high-dimensional feature vectors; and marking the pedestrian attribute in the to-be-detected image based on the positioning result.

In this embodiment of the present invention, feature extraction of an image is performed by a feature engine. The feature engine abstracts a to-be-detected image (for example, an image frame in video surveillance), and extracts a feature related to the pedestrian attribute. The feature engine includes a plurality of layers that are connected in series or in parallel. Each layer includes a combination of one or more convolution layers and one or more pooling layers. Different layers have different depths, and different layers have different abstraction degrees for the image. To be specific, a relatively shallow layer has a low abstraction degree for the image, and a fine-granularity feature in the image is retained; and a relatively deep layer has a high abstraction degree, and a coarse-granularity feature in the image is retained. Feature extraction is performed on the to-be-detected image at different layers, to obtain feature maps of different abstraction degrees and different scales.

In this embodiment of the present invention, extraction with different scales and different abstraction degrees is performed on an attribute feature at different layers, which can ensure that a fine-granularity attribute feature is retained at an earlier stage, thereby avoiding a problem that a small-scale and low-layer feature is lost or eliminated due to a plurality of operations of alternating a convolution operation and a pooling operation.

In this embodiment of the present invention, convolution on the first feature map is performed at a convolution layer, and each convolution layer includes a plurality of groups of convolution kernels.

In this embodiment of the present invention, pooling on the second feature map is performed at a flexible spatial pyramid pooling (FSPP) layer. Specifically, the FSPP layer is designed as a pyramid structure including a plurality of layers. The input feature map is divided into several areas (bins) in a different manner at each layer. These bins at each layer overlap each other. Some pixels in the feature map may be located in different bins at the same time. Sizes of these bins are the same, and these bins can exactly cover the entire feature map through overlapping. Max pooling processing is performed on each bin, to obtain a small vector (namely, a feature vector), where the feature vector represents a response value of the bin to the feature map.

For example, the FSPP layer is a two-layer pyramid. A first layer of the pyramid includes one bin. The one bin covers an entire middle-layer feature diagram. A max pooling operation is performed on the bin, to obtain a feature vector. At a second layer, a middle-layer feature diagram of an attribute is covered by 3×3 bins. Sizes of the nine bins are the same, a height of each bin is 40% of a height of the corresponding middle-layer feature diagram, and a width of each bin is 40% of a width of the corresponding middle-layer feature diagram. The nine bins spatially overlap each other, are distributed evenly, and cover the entire middle-layer feature diagram. The max pooling operation is separately performed on the nine bins, to obtain nine feature vectors. Therefore, each middle-layer feature diagram is processed into a 10-dimension feature vector group after the foregoing process.

It can be learned that in this embodiment of the present invention, output of a feature vector related to an attribute feature can be adjusted by using a flexible bin size and a bin combination, so as to enhance sensitivity of different bins to different middle-layer features, and clearly determine association degrees between an attribute and different bins. In addition, after weakly supervised training is performed on the FSPP layer, the association degrees between a pedestrian attribute and different bins can be adjusted, so that a middle-layer feature of the pedestrian attribute has a specific local spatial distribution trend, and the middle-layer feature of the pedestrian attribute is better associated with a spatial location. In addition, because the bins overlap each other, a middle-layer feature located in an overlapping area may belong to a plurality of bins at the same time, so that the middle-layer feature can be associated with the plurality of bins, and a positioning response area is extended, thereby helping implement more accurate positioning.

In this embodiment of the present invention, the integrating and regressing the plurality of high-dimensional feature vectors into a low-dimensional vector, to obtain an identification result of the pedestrian attribute includes: integrating the high-dimensional feature vectors of N branches, and then regressing the integrated high-dimensional vectors, to obtain a low-dimensional vector whose dimension quantity is the same as the quantity of required attribute classes; and normalizing the low-dimensional vector to an interval [0, 1] according to a sigmoid function, to obtain the identification result of the pedestrian attribute.

In this embodiment of the present invention, the positioning the pedestrian attribute includes: obtaining spatial location information of a pedestrian attribute by clustering response points in the input feature diagram, and directly marking the pedestrian attribute in the to-be-detected image based on the spatial location information.

With reference to the first aspect, in a specific embodiment, the convolutional neural network system to which the method is applied performs training by using a weak supervision method. The weakly supervised training is training that is performed based on a plurality of sample pictures; and the plurality of sample pictures include a positive sample picture and a negative sample picture. When the training needs to be performed, a sample picture (including a positive sample picture and a negative sample picture) that is input to a database only needs to include a truth label about whether a pedestrian attribute exists. In this way, the convolutional neural network system can be trained without having to perform border marking of the pedestrian attribute in the picture. For any pedestrian attribute, if the pedestrian attribute exists in the sample picture, the truth label is 1; or if the pedestrian attribute does not exist in the sample picture, the truth label is 0. The convolutional neural network system can constantly and automatically adjust some parameter settings through the weakly supervised training by using a large quantity of sample pictures, so that an identification result and a positioning result of the pedestrian attribute become more accurate. The parameter settings that can be automatically adjusted may also be referred to as parameters obtained through the weakly supervised training. The parameters obtained through the weakly supervised training include, for example, each group of convolution kernels (a convolution matrix) of a convolution layer, a pooling matrix of a pooling layer, an association degree value RS between a middle-layer feature of an attribute and a bin, and an association degree between a middle-layer feature and an attribute. These parameters are determined and corrected through a lot of automatic learning.

For example, determining an association degree between a middle-layer feature of a pedestrian attribute a and a bin is to determine a ratio of an average response value of a bin in the positive sample picture to an average response value of the bin in the negative sample picture, and a process is as follows:

An average response value PAve of a bin in the positive sample picture is:

$$PAve[d][k] = \frac{\sum_{i=1}^{N}(\text{score}[d][k][i] \times \text{Label}[i])}{\sum_{i=1}^{N}\text{Label}[i]}.$$

An average response value NAve of a bin in the negative sample picture is:

$$NAve[d][k] = \frac{\sum_{i=1}^{N}(\text{score}[d][k][i] \times (1 - \text{Label}[i]))}{\sum_{i=1}^{N}(1 - \text{Label}[i])}.$$

Therefore, a ratio of the average response value in the positive sample picture to the average response value in the negative sample picture is:

$$RS[d][k] = \frac{PAve[d][k]}{NAve[d][k]}, \text{ where } d \in [1, M]; k \in [1, NB_d].$$

RS represents an association degree array, and determines an association degree between a middle-layer feature of the pedestrian attribute a and a bin. In the foregoing formula, d represents a middle-layer feature diagram of a pedestrian attribute, k represents a bin, and N represents a total quantity of sample pictures input in training; M is equal to a total quantity of middle-layer feature diagrams of the pedestrian attribute, and also represents a total quantity of pyramids of the flexible spatial pyramid pooling layer; NB represents a total quantity of containers in the pyramid; Score represents an output value (namely, a feature vector) of a bin in the sample picture; and Label represents a label vector of the pedestrian attribute a in the sample picture, where Label of the positive sample picture is 1, and Label of the negative sample picture is 0.

It can be learned that in this embodiment of the present invention, a weakly supervised training method based on a truth label achieves relatively high efficiency in processing a sample picture, and can reduce human and material costs. The convolutional neural network based on the weakly supervised training can be applied to a video surveillance scenario to accurately identify and position a fine-granularity attribute feature of a pedestrian, and can be adapted to a plurality of application scenarios such as low resolution, a large angle of view difference, and environment occlusion in the video surveillance.

With reference to the first aspect, after an association degree value between each second feature map and each bin is predetermined through the weakly supervised training, the obtaining a positioning result of the pedestrian attribute based on the plurality of second feature maps and the plurality of high-dimensional feature vectors includes:

obtaining a weight value of each second feature map in each bin based on the association degree value and the plurality of high-dimensional feature vectors;

superimposing a plurality of second feature maps on which weighting is performed by using the respective weight values, to obtain an attribute possibility distribution diagram, where the attribute possibility distribution diagram represents distribution of response values of the pedestrian attribute in the to-be-detected image; and obtaining an area range in which the response value is greater than a threshold in the attribute possibility distribution diagram, performing clustering processing on the area range, to obtain an active cluster, and obtaining the positioning result of the pedestrian attribute based on the active cluster.

With reference to the first aspect, in a possible embodiment, when there are a plurality of active clusters, the obtaining the positioning result of the pedestrian attribute based on the active cluster includes the following steps:

First, a weight value of each second feature map in each bin is obtained based on the association degree value of association degree RS between a determined middle-layer feature and a bin and all the high-dimensional feature vectors, where $$w[d][k] = \frac{\text{score}[d][k] \times \text{norm\_score}[d][k] \times RS[d][k]}{\sum_{i=1}^{M} \text{score}[d][i] \times \text{norm\_score}[d][k] \times RS[d][i]},$$

where
a regularization score norm_score is:

norm_score[d][k]=score[d][k]/(pred$_a$[d][k]?PAve[d][k] ?PAve[d][k]:NAve[d][k]), where pred represents an identification value of the attribute a.

When the identification value of the attribute a is 1, norm_score[d][k]=score[d][k]/PAve[d][k]; or when the identification value of the attribute a is 0, norm_score[d][k]=score[d][k]/NAve[d][k].

Then, second feature maps that are obtained by using the N branches and on which weighting is performed by using the respective weight values are superimposed, to obtain an attribute possibility distribution diagram D, where the attribute possibility distribution diagram represents distribution of response values of the pedestrian attribute in the to-be-detected image; where $D=D+w[d][k]\times\text{Resize}(A[d]\times\text{mask}(H_{img}, W_{img}))$, where $d\in[1,M], k\in[1,NB_1]$.

W and H represent a size of the middle-layer feature diagram; Resize represents that the size of the obtained image is adjusted; and A represents the middle-layer feature diagram of the pedestrian attribute.

Then, an area range in which the response value is greater than a threshold in the attribute possibility distribution diagram is obtained, and clustering processing is performed on the area range, to obtain one or more active clusters, so as to determine a central point of the active cluster, and select the central point as an indication point of a pedestrian attribute location.

With reference to the first aspect, in a possible embodiment, when there are a plurality of active clusters, that the attribute positioning module is configured to obtain the positioning result of the pedestrian attribute based on the active cluster includes: determining a quantity of pedestrian attributes in the to-be-detected image; determining an average response value of each active cluster; sorting the plurality of active clusters based on the average response values; and obtaining, based on a sorting result, the same quantity of active clusters as the pedestrian attributes, to obtain the positioning result of the pedestrian attribute.

For example, for a pedestrian attribute "gloves", a quantity of gloves of each pedestrian is predefined as two. Therefore, in related calculation for positioning a pedestrian attribute "wearing gloves", if there are a plurality of determined active clusters, average response values of active clusters are calculated, the active clusters are sorted in descending order of the average response values, and first two active clusters with largest average response values in the sequence are retained, and central points of the two active clusters are location indication points of the pedestrian attribute "wearing gloves".

With reference to the first aspect, in a possible embodiment, the pedestrian attribute may be marked in the location indication point in the to-be-detected image, so that a user can directly find an accurate location of the pedestrian attribute in the to-be-detected image. The pedestrian attribute may be marked in various manners. For example, the pedestrian attribute may be marked by setting a pattern such as a cross or a highlighted box at the location indication point.

According to a second aspect, an embodiment of the present invention provides a convolutional neural network system for pedestrian attribute identification and positioning, where the system includes a feature extraction module, a multi-scale perception module, an attribute identification module, and an attribute positioning module; the multi-scale perception module includes N parallel convolution layers and N parallel flexible spatial pyramid pooling (FSPP) layers, where one convolution layer is connected to one flexible spatial pyramid pooling layer; the feature extraction module is connected to the N parallel convolution layers by using N branches; the attribute identification module is connected to the N parallel flexible spatial pyramid pooling layers by using N branches; and the attribute positioning module is connected to the multi-scale perception module by using N branches.

(1) The feature extraction module is configured to: perform feature extraction on a to-be-detected image at N different abstraction degrees, to obtain N first feature maps of a pedestrian attribute, where these feature maps may be referred to as general features of the pedestrian attribute (or referred to as general feature diagrams of the pedestrian attribute); and respectively send the N first feature maps to the N parallel convolution layers by using the N branches.

The feature extraction module serves as a feature engine of a convolutional neural network, and is configured to: abstract the to-be-detected image (for example, an image frame in video surveillance), and extract a feature related to the pedestrian attribute. The feature extraction module may include a plurality of layers that are connected in series or in parallel. Each layer includes a combination of one or more convolution layers and one or more pooling layers. Different layers have different depths, and different layers have different abstraction degrees for the image. To be specific, a relatively shallow layer has a low abstraction degree for the image, and a fine-granularity feature in the image is retained; and a relatively deep layer has a high abstraction degree, and a coarse-granularity feature in the image is retained. Feature maps of different abstraction degrees and different scales can be obtained by performing feature extraction on the to-be-detected image at different layers.

In this embodiment of the present invention, extraction with different scales and different abstraction degrees is performed on an attribute feature at different layers, which can ensure that a fine-granularity attribute feature is retained at an earlier stage, thereby avoiding a problem that a small-scale and low-layer feature is lost or eliminated due to a plurality of operations of alternating a convolution operation and a pooling operation.

(2) The multi-scale perception module is configured to: perform, by using a convolution layer corresponding to a first branch in the N branches, convolution on the first feature map received by the convolution layer, to obtain a second feature map, where the first branch is any one of the N branches, and the new feature map may be referred to as a middle-layer feature of the pedestrian attribute (or referred to as a middle-layer feature diagram of the pedestrian attribute); map, by using an FSPP layer corresponding to the first branch, the second feature map received by the FSPP layer to a plurality of areas (bins) that overlap each other, and perform max pooling on each bin, to obtain a high-dimensional feature vector, where the bins that overlap each other evenly and completely cover the second feature map.

Specifically, in this embodiment of the present invention, the FSPP layer is designed as a pyramid structure including a plurality of layers. The input feature map is divided into several areas (bins) in a different manner at each layer. These bins at each layer overlap each other. Some pixels in the feature map may be located in different bins at the same time. Sizes of these bins are the same, and these bins can exactly cover the entire feature map through overlapping. Max pooling processing is performed on each bin, to obtain a small vector (namely, a feature vector), where the feature vector represents a response value of the bin to the feature map.

It can be learned that the FSPP layer provided in this embodiment of the present invention can adjust output of a feature vector related to an attribute feature by using a flexible bin size and a bin combination, so as to enhance sensitivity of different bins to different middle-layer features, and clearly determine association degrees between an attribute and different bins. In addition, after weakly supervised training is performed on the FSPP layer, the association degrees between a pedestrian attribute and different bins can be adjusted, so that a middle-layer feature of the pedestrian attribute has a specific local spatial distribution trend, and the middle-layer feature of the pedestrian attribute is better associated with a spatial location. In addition, because the bins overlap each other, a middle-layer feature located in an overlapping area may belong to a plurality of bins at the same time, so that the middle-layer feature can be associated with the plurality of bins, and a positioning response area is extended, thereby helping the attribute positioning module implement more accurate positioning subsequently.

(3) The attribute identification module is configured to: integrate and regress all high-dimensional feature vectors that are obtained by using the N branches, to obtain a low-dimensional vector, and obtain an identification result of the pedestrian attribute based on the low-dimensional vector.

The attribute identification module includes a fully connected layer and an output layer for a final prediction result. The attribute identification module, serving as a classifier for attribute features, classifies input features, and then outputs a quantity of required attribute classes. Specifically, the attribute identification module integrates the high-dimensional feature vectors of the N branches; then regresses the integrated high-dimensional vectors, to obtain a low-dimensional vector whose dimension quantity is the same as the quantity of required attribute classes; and normalizes the low-dimensional vector to an interval [0, 1] according to a sigmoid function, to obtain an identification result of the pedestrian attribute.

(4) The attribute positioning module is configured to: cluster response points in the input feature diagram, to obtain spatial location information of a pedestrian attribute, and directly mark the pedestrian attribute in the to-be-detected image based on the spatial location information. Specifically, a positioning result of the pedestrian attribute is obtained based on all the second feature maps and all the high-dimensional feature vectors that are obtained by using the N branches.

The pedestrian attribute in this embodiment of the present invention includes feature information of a pedestrian. For example, the pedestrian attribute may be a pedestrian gender, a hair length, a clothes color, a clothes style, a shoes style, a hat style, or wearing a necklace, wearing glasses, wearing gloves, wearing a scarf, wearing a hat, carrying a backpack, or the like.

With reference to the second aspect, in a possible embodiment, the feature extraction module uses an inception architecture of a GoogLeNet model as a feature engine, to extract general features of the pedestrian attribute of the to-be-detected image at Inception4a/output, Inception4d/output, and Inception5b/output, and input the general features to three convolution layers of the multi-scale perception module.

With reference to the second aspect, in a possible embodiment, each convolution layer includes a plurality of groups of convolution kernels; and the flexible spatial pyramid pooling layer includes a plurality of layers, each layer includes a plurality of bins with a different quantity, and the plurality of bins at each layer overlap each other, and evenly and completely cover the second feature map; and that the multi-scale perception module is configured to perform, by using a convolution layer corresponding to a first branch, convolution on the first feature map received by the convolution layer, to obtain a second feature map includes: performing, by using each group of convolution kernels of each convolution layer, convolution on the received first feature map, to obtain the second feature map; and mapping, by the FSPP layer, the second feature map that is obtained by using each group of convolution kernels to a plurality of bins with a different quantity, performing max pooling on each bin, to obtain a feature vector corresponding to each group of convolution kernels, and integrating all the feature vectors that are obtained by using the plurality of groups of convolution kernels into a high-dimensional feature vector.

With reference to the second aspect, in a possible embodiment, the multi-scale perception module has three convolution layers. The three convolution layers respectively have 512, 512, and 1024 groups of convolution kernels, that is, respectively correspond to 512, 512, and 1024 channels. Each group of convolution kernels is configured to convert a general feature of the pedestrian attribute into a middle-layer feature of the pedestrian attribute, and input the middle-layer feature of the pedestrian attribute to a corresponding FSPP layer through a corresponding channel.

With reference to the second aspect, in a possible embodiment, a pyramid of the FSPP layer is limited to two layers, and includes a layer of 1×1 bin and a layer of 3×3 bins that overlap each other. A middle-layer feature diagram of each channel is processed, at a corresponding FSPP layer, into a small vector (a feature vector) whose dimension quantity is equal to a total quantity of bins at the FSPP layer, and finally high-dimensional feature vectors of three branches are formed.

For example, the FSPP layer is designed as a two-layer pyramid. A first layer of the pyramid includes one bin. The one bin covers an entire middle-layer feature diagram. A max pooling operation is performed on the bin, that is, a global max pooling operation is performed on the input middle-layer feature diagram, to obtain a feature vector. At a second layer, a middle-layer feature diagram of an attribute is covered by 3×3 bins. Sizes of the nine bins are the same, a height of each bin is 40% of a height of the corresponding middle-layer feature diagram, and a width of each bin is 40% of a width of the corresponding middle-layer feature diagram. The nine bins spatially overlap each other, are distributed evenly, and cover the entire middle-layer feature diagram. The max pooling operation is separately performed on the nine bins, that is, the max pooling operation is separately performed on areas in the input middle-layer feature diagram that are in a one-to-one correspondence with the nine bins, to obtain nine feature vectors. Therefore, each middle-layer feature diagram is processed into a 10-dimension feature vector group after the foregoing process.

With reference to the second aspect, in a specific embodiment, the convolutional neural network system performs training by using a weak supervision method. The weakly supervised training is training that is performed based on a plurality of sample pictures; and the plurality of sample pictures include a positive sample picture and a negative sample picture. When the training needs to be performed, a sample picture (including a positive sample picture and a negative sample picture) that is input to a database only needs to include a truth label about whether a pedestrian attribute exists. In this way, the convolutional neural network system can be trained without having to perform border marking of the pedestrian attribute in the picture. For any pedestrian attribute, if the pedestrian attribute exists in the sample picture, the truth label is 1; or if the pedestrian attribute does not exist in the sample picture, the truth label is 0. The convolutional neural network system can constantly and automatically adjust some parameter settings through the weakly supervised training by using a large quantity of sample pictures, so that an identification result and a positioning result of the pedestrian attribute become more accurate. The parameter settings that can be automatically adjusted may also be referred to as parameters obtained through the weakly supervised training. The parameters obtained through the weakly supervised training include, for example, each group of convolution kernels (a convolution matrix) of a convolution layer, a pooling matrix of a pooling layer, an association degree value RS between a middle-layer feature of an attribute and a bin, and an association degree between a middle-layer feature and an attribute. These parameters are determined and corrected through a lot of automatic learning.

With reference to the second aspect, in a specific embodiment, the convolutional neural network system can automatically learn a middle-layer feature and a pedestrian attribute between which there is a higher association degree, and can also automatically learn a bin of a larger weight for a middle-layer feature of a pedestrian attribute. In an initial stage, the convolutional neural network system does not know these association degrees or bin weights. In each training cycle, the convolutional neural network system transfers, based on the truth label of the sample picture by using a back propagation function, gradients from a prediction layer of an attribute back to a multi-scale perception module and a feature extraction module through an FC layer. These gradients are directly related to an existence label of the middle-layer feature. The FC layer pre-codes a positive correlation or a negative correlation between a middle-layer feature and an attribute, so that a middle-layer feature that is in a positive correlation with the attribute can be determined. When the pedestrian attribute in the sample picture is marked as "existent", a gradient related to a corresponding middle-layer feature is transmitted to a related bin that outputs the feature, thereby increasing a response degree of the related bin to the middle-layer feature. The gradient is transmitted to a convolution layer of the multi-scale perception module, and a convolution matrix of each convolution layer is adjusted, to encourage the related convolution layer to extract the middle-layer feature. The gradient is transmitted to the feature extraction module, and a convolution matrix and a pooling matrix of each layer of the feature extraction module may be further adjusted, to encourage the feature extraction module to extract a general feature that is in a positive correlation with the attribute. In addition, in the foregoing process, a feature response that is in a negative correlation with the attribute is suppressed. It may be understood that when the pedestrian attribute in the sample picture is marked as "nonexistent", existence of the middle-layer feature of the attribute is to be suppressed.

With reference to the second aspect, in a possible embodiment, a positioning process of the attribute positioning module includes:

obtaining a weight value of each second feature map in each bin based on the association degree value of association degree RS between a determined middle-layer feature and a bin and all the high-dimensional feature vectors;

then, superimposing second feature maps that are obtained by using the N branches and on which weighting is performed by using the respective weight values, to obtain an attribute possibility distribution diagram D, where the attribute possibility distribution diagram represents distribution of response values of the pedestrian attribute in the to-be-detected image; and finally, obtaining an area range in which the response value is greater than a threshold in the attribute possibility distribution diagram, and performing clustering processing on the area range, to obtain one or more active clusters, so as to determine a central point of the active cluster, and select the central point as an indication point of a pedestrian attribute location.

With reference to the second aspect, in a possible embodiment, when there are a plurality of active clusters, that the attribute positioning module is configured to obtain the positioning result of the pedestrian attribute based on the active cluster includes: determining a quantity of pedestrian attributes in the to-be-detected image; determining an average response value of each active cluster; sorting the plurality of active clusters based on the average response values; and obtaining, based on a sorting result, the same quantity of active clusters as the pedestrian attributes, to obtain the positioning result of the pedestrian attribute.

With reference to the second aspect, in a possible embodiment, the pedestrian attribute may be marked in the location indication point in the to-be-detected image, so that a user can directly find an accurate location of the pedestrian attribute in the to-be-detected image. The pedestrian attribute may be marked in various manners. For example, the pedestrian attribute may be marked by setting a pattern such as a cross or a highlighted box at the location indication point.

According to a third aspect, an embodiment of the present invention provides a hardware device for pedestrian attribute identification and positioning. The hardware device includes a processor and a memory, where the processor is connected to the memory (for example, by using a bus). The memory is configured to store related program code and data (for example, related data of a convolutional neural network system), and the processor is configured to read the program code stored in the memory, to perform the method in the first aspect.

According to a fourth aspect, an embodiment of the present invention provides a computer readable storage medium, configured to store code that is used to implement the method in the first aspect.

According to a fifth aspect, an embodiment of the present invention provides a computer software product, where when the computer software product is run on a computer, the computer is enabled to implement the method in the first aspect.

It can be learned that in the embodiments of the present invention, general features of a pedestrian attribute of different abstraction degrees are extracted, so that a fine-granularity attribute feature is retained. After the general features are converted into middle-layer features, pedestrian attribute identification may be performed based on the related feature vector of the middle-layer feature, and a fine-granularity attribute feature (for example "wearing glasses") in a video surveillance scenario can be better identified, achieving a higher robustness and a better effect in pedestrian attribute identification. In addition, the pedestrian attribute positioning may also be performed based on the middle-layer feature diagram and the related feature vector of the middle-layer feature, which can be adapted to a plurality of application scenarios such as low resolution, a large angle of view difference, and environment occlusion in the video surveillance, thereby filling the blank of an attribute positioning method in a surveillance scenario in the prior art. In addition, in the embodiments of the present invention, a weakly supervised training method based on a truth label achieves relatively high efficiency in processing a sample picture, and can effectively reduce human and material costs.

DESCRIPTION OF EMBODIMENTS

Figure 1:
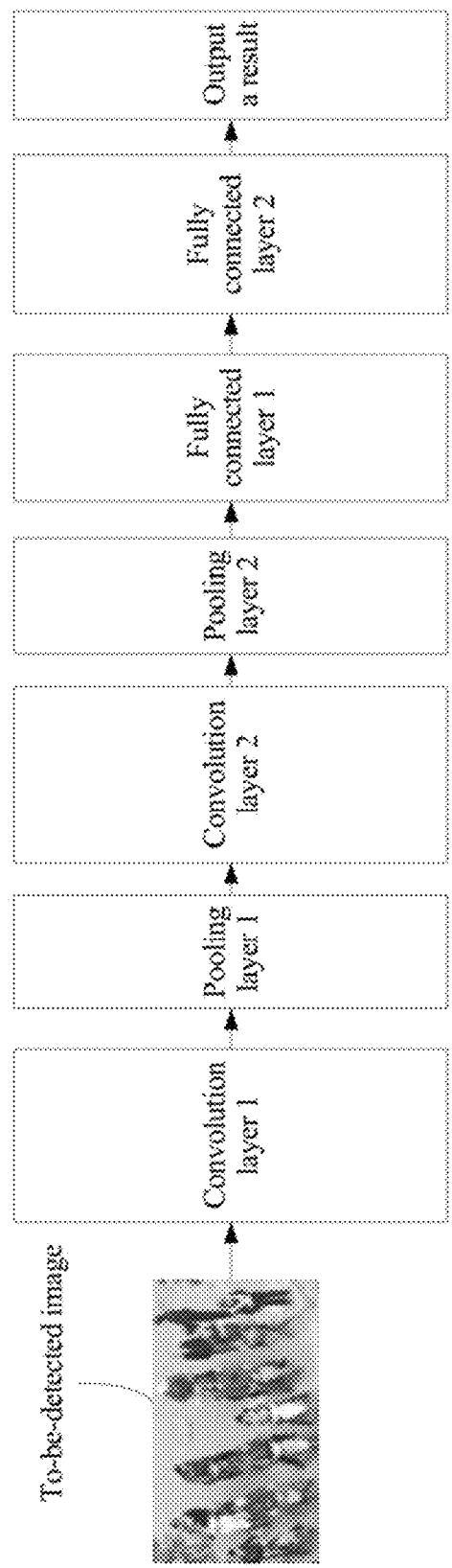
FIG. 1 is a schematic structural diagram of a convolutional neural network system in the prior art.

For ease of understanding, the following first describes a convolutional neural network (CNN) system in the prior art. Referring to FIG. 1, generally, the CNN system includes a convolution layer, a pooling layer, and a fully connected layer. After a to-be-detected image is input to the CNN system, a convolution kernel in the first convolution layer (for example, a convolution layer 1 in the figure) filters the image, and extracts a feature of an attribute or features of some attributes through convolution processing, and outputs a feature map after the convolution processing is performed. The first pooling layer (a pooling layer 1 in the figure) performs pooling on the feature map, to further reduce a quantity of parameters and obtain a feature vector. Before a final prediction result is output, the image usually is processed by a plurality of convolution layers and pooling layers (for example, a convolution layer 2 and a pooling layer 2 that are included in the figure). Usually, some insignificant information is constantly lost in convolution and pooling processes to reduce parameters and a space size of the feature map. A deeper convolutional neural network extracts a more specific and clearer feature, and a shallower network extracts a more superficial feature. Data that is obtained through convolution and pooling processing is input to the fully connected layer (for example, a fully connected layer 1 and a fully connected layer 2 that are included in the figure), and integration and dimension reduction are performed on the data, to obtain a normalized prediction result whose quantity is the same as a total quantity of attribute classes. Finally, the prediction result is output, so as to identify an attribute in the to-be-detected image. Before actual application, the CNN system usually automatically performs deep learning based on a large quantity of pictures, and performs a great deal of training by using a related training algorithm and a back propagation algorithm, so as to constantly adjust parameter settings in the CNN system, and improve attribute identification performance.

Based on a powerful function of the CNN system in image identification, the CNN system has great commercial value in application scenarios such as face recognition, commodity recommendation, object classification, target tracking, and video surveillance. Especially, in a video surveillance system, applying the CNN system to pedestrian attribute identification and positioning can help to construct an intelligent security surveillance network, and has a great application potential. However, the CNN system in the prior art has some disadvantages when being applied to the video surveillance system. Firstly, considering a storage requirement and a relatively long shooting distance, resolution of a pedestrian image in video surveillance is usually not high. For some pedestrian attributes with a relatively small quantity of pixels, after these pedestrian attributes are input to the CNN system, a small-scale and lower-layer attribute feature is easily lost or ignored in a plurality of processes of alternating a convolution operation and a pooling operation, and consequently a fine-granularity attribute such as "wearing glasses" cannot be identified. Secondly, in long-distance video surveillance, a pedestrian image captured from a surveillance video has relatively low resolution, and an environmental obstacle or a pedestrian appendage in the video may block a pedestrian attribute, and consequently, a final pedestrian attribute is hard to be identified. In addition, different shooting angles cause a change of a pedestrian posture in the video surveillance, and consequentially it is relatively difficult to directly and simultaneously identify all attributes of a pedestrian. Further, the CNN system in the video surveillance usually performs deep learning in a fully-supervised training manner. During the fully-supervised training, usually, a boundary calibration box of a pedestrian attribute needs to be manually marked in a sample picture, and then the picture is input to a model for training. However, manually annotating object boundary boxes in tens of thousands of sample pictures with a plurality of types of attributes in a large database requires much time and effort, and costs are very high. Further, some pedestrian attributes have ambiguous boundary definitions. For example, a pedestrian attribute such as "wearing glasses" is different from a simple object attribute such as "glasses", and a boundary cannot be simply defined. Lastly, positioning of a pedestrian attribute in the video surveillance system is still a challenge currently, and the CNN system based on the fully-supervised training is not suitable for the pedestrian attribute positioning task.

To overcome the disadvantages in the prior art, the embodiments of the present invention provide a pedestrian attribute identification and positioning method applicable to video surveillance and a convolutional neural network system based on weakly supervised training, so as to better identify and position a pedestrian attribute.

The following describes a convolutional neural network system provided in an embodiment of the present invention. The convolutional neural network system provided in this embodiment of the present invention may be configured to identify and position a pedestrian attribute. The pedestrian attribute includes feature information of a pedestrian. For example, the pedestrian attribute may be a pedestrian gender, a hair length, a clothes color, a clothes style, a shoes style, a hat style, or wearing a necklace, wearing glasses, wearing gloves, wearing a scarf, wearing a hat, carrying a backpack, or the like. It may be understood that the identifying a pedestrian attribute is to identify a specific pedestrian attribute in an image, and the positioning a pedestrian attribute is to position a specific location of the pedestrian attribute in the image.

Figure 2:
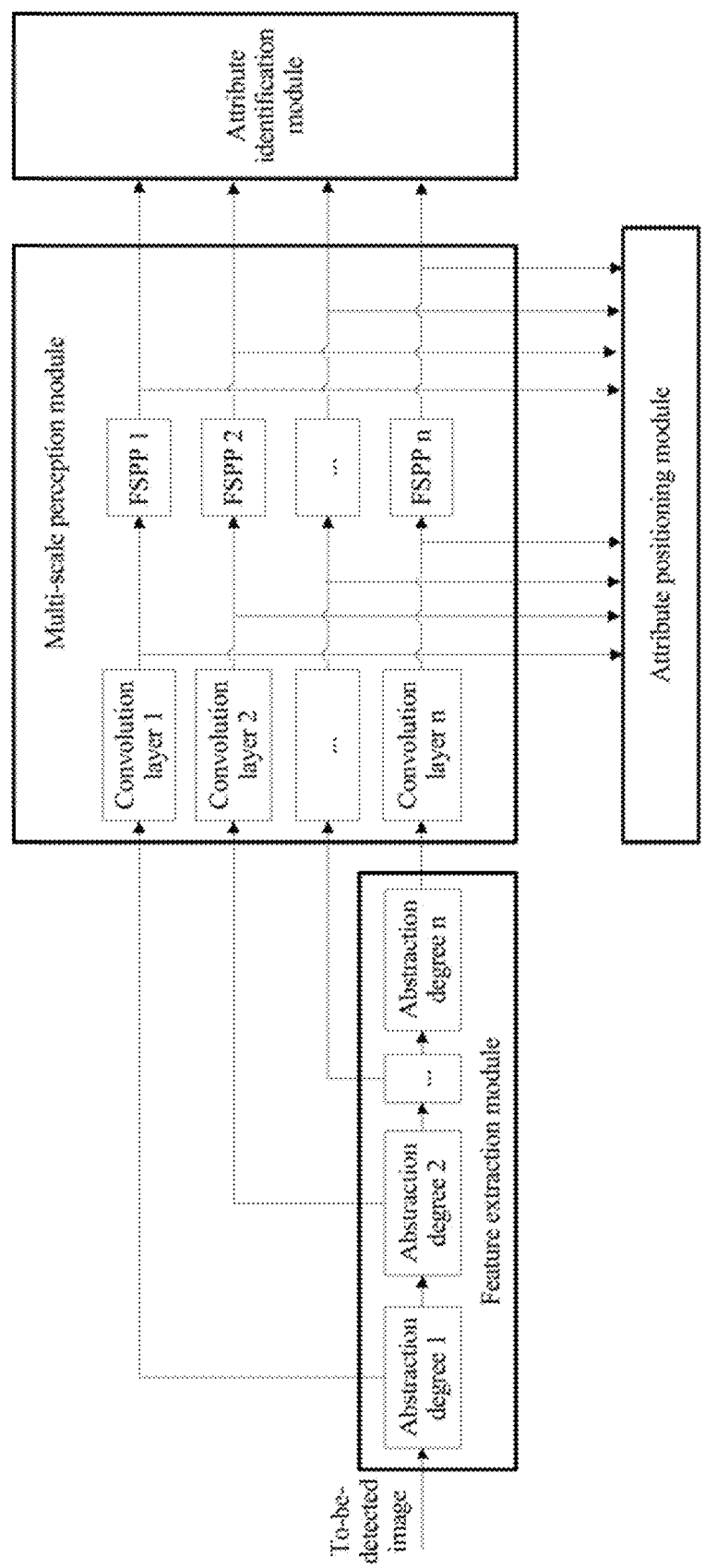
FIG. 2 is a schematic structural diagram of a convolutional neural network system according to an embodiment of the present invention.

Referring to FIG. 2, the convolutional neural network system provided in this embodiment of the present invention includes a feature extraction module, a multi-scale perception module, an attribute identification module, and an attribute positioning module. The feature extraction module may be connected to the multi-scale perception module by using N branches; the attribute identification module is connected to the multi-scale perception module by using N branches; and the attribute positioning module is connected to the multi-scale perception module by using at least N branches. Specific description of each module is as follows:

(1) Feature extraction module: In this embodiment of the present invention, the feature extraction module serves as a feature engine of a convolutional neural network, and is configured to: abstract a to-be-detected image (for example, an image frame in video surveillance), and extract a feature related to a pedestrian attribute. The feature extraction module may include a plurality of layers that are connected in series or in parallel. Each layer includes a combination of one or more convolution layers and one or more pooling layers. Different layers have different depths, and different layers have different abstraction degrees for the image (such as an abstraction degree 1 and an abstraction degree 2 shown in FIG. 2). To be specific, a relatively shallow layer has a low abstraction degree for the image, and a fine-granularity feature in the image is retained; and a relatively deep layer has a high abstraction degree, and a coarse-granularity feature in the image is retained. Feature maps of different abstraction degrees and different scales can be obtained by performing feature extraction on the to-be-detected image at different layers. These feature maps may be referred to as general features of the pedestrian attribute (or referred to as general feature diagrams of the pedestrian attribute). In this embodiment of the present invention, after being output from different layers, N general features of the pedestrian attribute may be respectively input to N parallel convolution layers of the multi-scale perception module by using the N branches.

For example, in specific implementation, the feature extraction module may extract a feature by using an inception structure in a GoogLeNet model, that is, extract the feature at different layers of the inception structure, and respectively output, as subsequent input to the multi-scale perception module, general features of attributes of three scales and abstraction degrees from an "inception4a/output" layer, an "inception4d/output" layer, and an "inception5b/output" layer of the inception structure.

It can be learned that in this embodiment of the present invention, extraction with different scales and different abstraction degrees is performed on an attribute feature at different layers, which can ensure that a fine-granularity attribute feature is retained at an earlier stage, thereby avoiding a problem that a small-scale and low-layer feature is lost or eliminated due to a plurality of operations of alternating a convolution operation and a pooling operation.

(2) Multi-scale perception module: The multi-scale perception module is configured to implement multi-scale perception of an attribute feature, and provide input for the attribute identification module and the attribute positioning module.

As shown in FIG. 2, the multi-scale perception module includes N parallel convolution layers and N parallel flexible spatial pyramid pooling (FSPP) layers, and one convolution layer is connected to one FSPP layer. Feature maps (namely, the general features of the pedestrian attribute) of the N branches output by the feature extraction module are respectively input to different convolution layers. The convolution layer may include M groups of parallel convolution kernels. Each group of convolution kernels at a convolution layer corresponding to each branch performs convolution on the input general feature of the pedestrian attribute, to obtain a new feature map, where the new feature map may be referred to as a middle-layer feature of the pedestrian attribute (or referred to as a middle-layer feature diagram of the pedestrian attribute). In other words, the convolution layers in the multi-scale perception module are responsible for converting general features of different scales and different abstraction degrees into middle-layer features related to the attribute.

In a branch of the multi-scale perception module, after the middle-layer feature of the attribute is obtained by using the convolution layer, the flexible spatial pyramid pooling layer is configured to perform pooling processing on the middle-layer feature. In this embodiment of the present invention, the FSPP layer is designed as a pyramid structure including a plurality of layers. The input feature map is divided into several areas (bins) in a different manner at each layer. These bins at each layer overlap each other. Some pixels in the feature map may be located in different bins at the same time. Sizes of these bins are the same, and these bins can exactly cover the entire feature map through overlapping. Max pooling processing is performed on each bin, to obtain a small vector (namely, a feature vector), where the feature vector represents a response value of the bin to the feature map. For any branch, if the convolution layer includes M groups of convolution kernels, and a quantity of bins at a corresponding FSPP layer is K, at least M×K small vectors may be obtained for the branch, and these M×K small vectors may be integrated into a high-dimensional feature vector of M×K dimensions.

Figure 3:
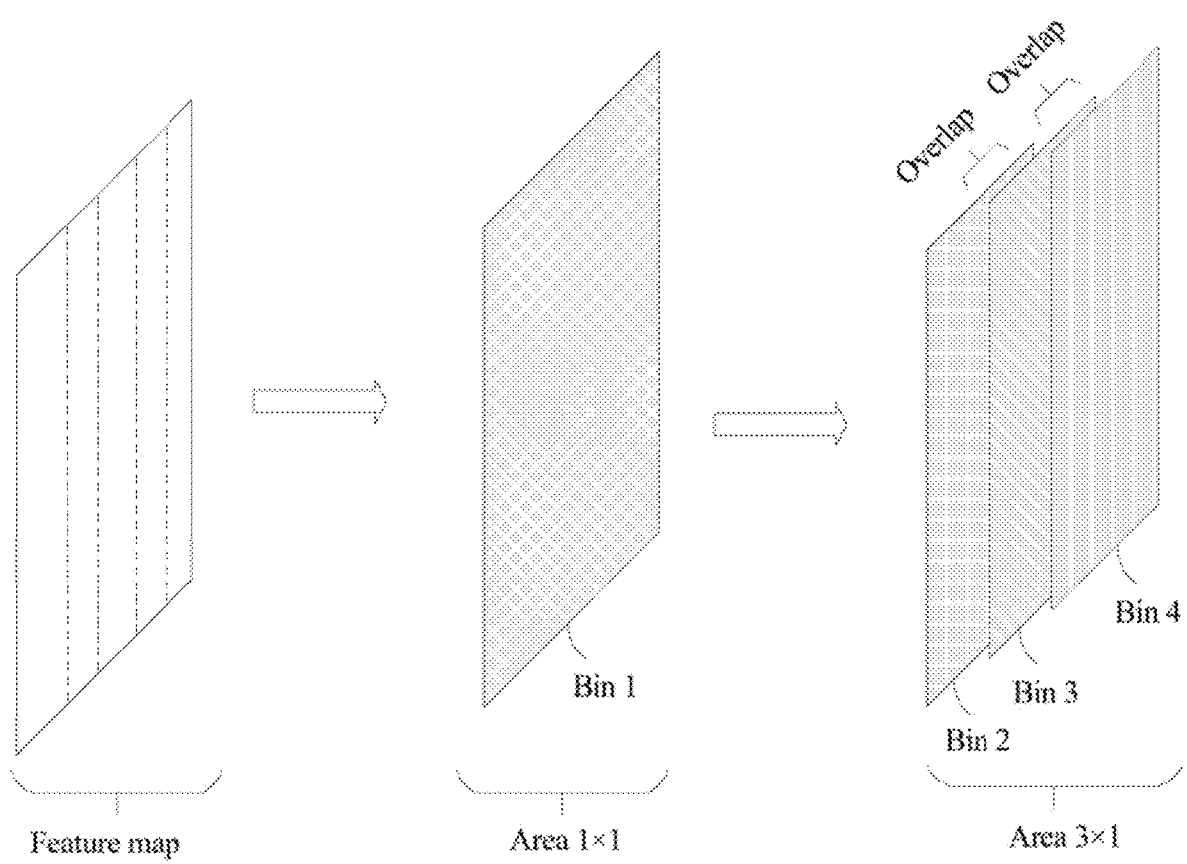
FIG. 3 is a scenario diagram of an example in which a feature map is mapped to a bin according to an embodiment of the present invention.

For example, in a specific application scenario in FIG. 3, the FSPP layer is designed as a two-layer pyramid. A first layer of the pyramid includes one bin (that is, a bin 1 in the figure). The bin 1 covers an entire middle-layer feature diagram. A max pooling operation is performed on the bin 1, that is, a global max pooling operation is performed on the input middle-layer feature diagram, to obtain a feature vector. At a second layer, a feature diagram of an attribute is covered by 3×1 bins (that is, a bin 2, a bin 3, and a bin 4 in the figure). Sizes of the three bins are the same, a height of each bin is the same as a height of the corresponding middle-layer feature diagram, and a width of each bin is 40% of a width of the corresponding middle-layer feature diagram (the proportion value may be set according to a requirement). The three bins spatially overlap each other (for example, in the figure, the bin 2 and the bin 3 overlap, and the bin 3 and the bin 4 overlap), are distributed evenly, and cover the corresponding middle-layer feature diagram. The max pooling operation is separately performed on the three bins, that is, the max pooling operation is separately performed on areas in the input middle-layer feature diagram that are in a one-to-one correspondence with the three bins, to obtain three feature vectors. Therefore, each middle-layer feature diagram is processed into a four-dimension feature vector group after the foregoing process.

Figure 4:
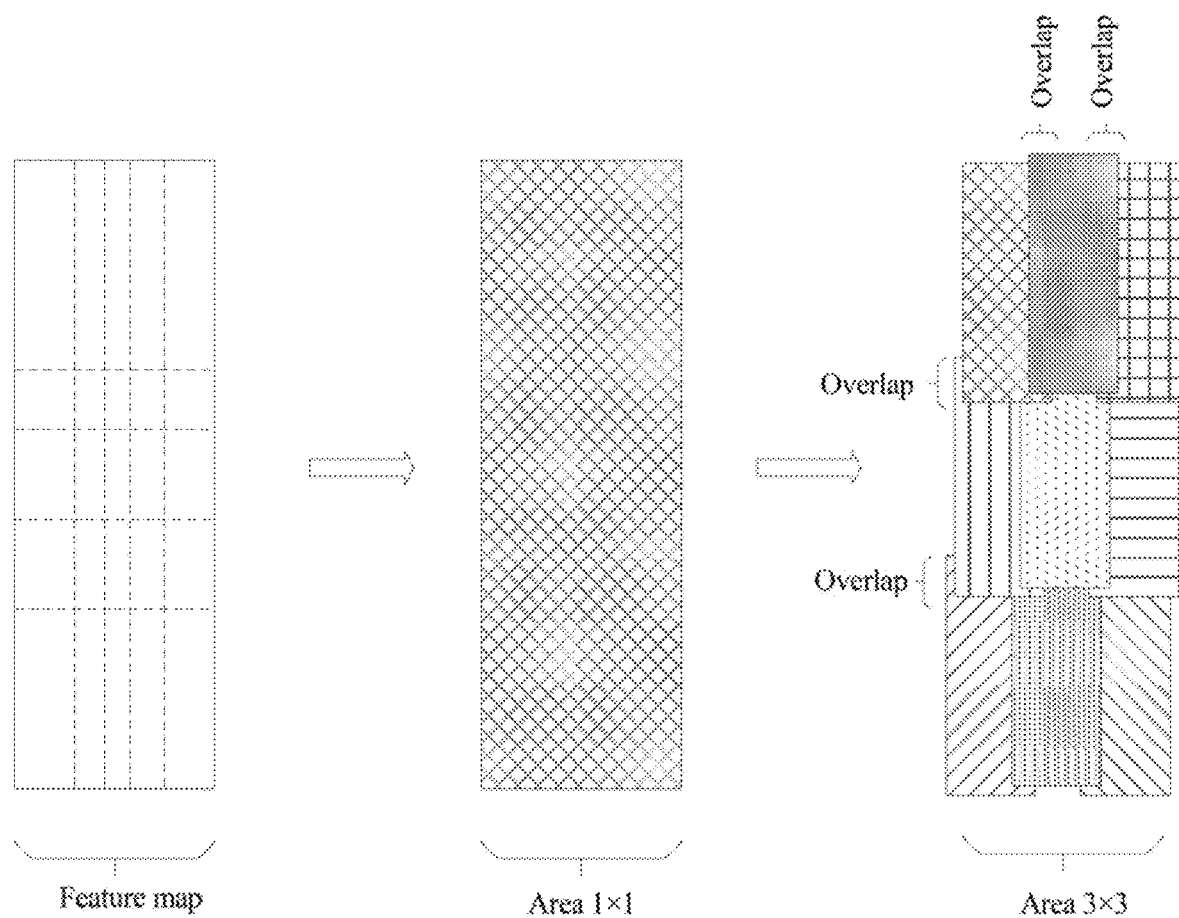
FIG. 4 is a scenario diagram of another example in which a feature map is mapped to a bin according to an embodiment of the present invention.

For another example, in a specific application scenario in FIG. 4, the FSPP layer is designed as a two-layer pyramid. A first layer of the pyramid includes one bin (that is, an area 1×1 in FIG. 4). The one bin covers an entire middle-layer feature diagram. A max pooling operation is performed on the bin, that is, a global max pooling operation is performed on the input middle-layer feature diagram, to obtain a feature vector. At a second layer, a middle-layer feature diagram of an attribute is covered by 3×3 bins (that is, 3×3 different shadow areas in an area 3×3 in FIG. 4). Sizes of the nine bins are the same, a height of each bin is 40% of a height of the corresponding middle-layer feature diagram, and a width of each bin is 40% of a width of the corresponding middle-layer feature diagram (the proportion value may be set according to a requirement). The nine bins spatially overlap each other, are distributed evenly, and cover the entire middle-layer feature diagram. The max pooling operation is separately performed on the nine bins, that is, the max pooling operation is separately performed on the areas in the input middle-layer feature diagram that are in a one-to-one correspondence with the nine bins, to obtain nine feature vectors. Therefore, each middle-layer feature diagram is processed into a 10-dimension feature vector group after the foregoing process.

In other words, each feature map of each branch is processed into a small vector whose dimension quantity is equal to a total quantity of bins at a corresponding FSPP layer after passing through the FSPP layer, and is finally integrated into a high-dimensional vector group. High-dimensional vectors of different branches are to be used as input for a subsequent module.

It can be learned that the FSPP layer provided in this embodiment of the present invention can adjust output of a feature vector related to an attribute feature by using a flexible bin size and a bin combination, so as to enhance sensitivity of different bins to different middle-layer features, and clearly determine association degrees between an attribute and different bins. In addition, after weakly supervised training is performed on the FSPP layer, the association degrees between a pedestrian attribute and different bins can be adjusted, so that a middle-layer feature of the pedestrian attribute has a specific local spatial distribution trend, and the middle-layer feature of the pedestrian attribute is better associated with a spatial location. In addition, because the bins overlap each other, a middle-layer feature located in an overlapping area may belong to a plurality of bins at the same time, so that the middle-layer feature can be associated with the plurality of bins, and a positioning response area is extended, thereby helping the attribute positioning module implement more accurate positioning subsequently.

(3) Attribute identification module: The attribute identification module includes a fully connected layer and an output layer for a final prediction result. The attribute identification module, serving as a classifier for attribute features, classifies input features, and then outputs a quantity of required attribute classes. Specifically, after receiving the high-dimensional feature vectors of the N branches sent by the multi-scale perception module, the attribute identification module integrates the high-dimensional feature vectors of the N branches; then regresses the integrated high-dimensional vectors, to obtain a low-dimensional vector whose dimension quantity is the same as the quantity of required attribute classes; and normalizes the low-dimensional vector to an interval [0, 1] according to a sigmoid function, where a prediction result with a relatively large value in this interval is an identification result of the pedestrian attribute.

(4) Attribute positioning module: The attribute positioning module is configured to: cluster response points in the input feature diagram, obtain spatial location information of a pedestrian attribute, and directly mark the pedestrian attribute in the to-be-detected image based on the spatial location information.

Specifically, after obtaining the new feature maps of the N branches (namely, the middle-layer features of the pedestrian attribute) and the high-dimensional feature vectors of the N branches, the multi-scale perception module sends the new feature maps of the N branches and the high-dimensional feature vectors of the N branches to the attribute positioning module. The attribute positioning module obtains a positioning result of the pedestrian attribute based on the middle-layer features of the pedestrian attribute and the high-dimensional feature vectors corresponding to the middle-layer features.

The following describes in detail a process in which the attribute positioning module performs pedestrian attribute positioning according to an embodiment of the present invention.

In this embodiment of the present invention, to position a pedestrian attribute a, an association degree between a middle-layer feature of the pedestrian attribute a and a bin needs to be first predetermined, and a process of determining the association degree is implemented through weakly supervised training. In a process of performing the weakly supervised training by using a large quantity of pictures, the pictures input to the convolutional neural network system include a large quantity of positive sample pictures and negative sample pictures. The positive sample picture is a picture having a relatively high association with the pedestrian attribute a (for example, the pedestrian attribute a exists in the picture), and the negative sample picture is a picture having a relatively low association with the pedestrian attribute a (for example, the pedestrian attribute a does not exist in the picture). Determining the association degree between a middle-layer feature of the pedestrian attribute a and a bin is to determine a ratio of an average response value of a bin in the positive sample picture to an average response value of the bin in the negative sample picture, and a process is as follows:

An average response value PAve of a bin in the positive sample picture is:

$$PAve[d][k] = \frac{\sum_{i=1}^{N}(score[d][k][i] \times Label[i])}{\sum_{i=1}^{N} Label[i]}.$$

An average response value NAve of a bin in the negative sample picture is:

$$NAve[d][k] = \frac{\sum_{i=1}^{N}(score[d][k][i] \times (1 - Label[i]))}{\sum_{i=1}^{N}(1 - Label[i])}.$$

Therefore, a ratio of the average response value in the positive sample picture to the average response value in the negative sample picture is:

$$RS[d][k] = \frac{PAve[d][k]}{NAve[d][k]}, \text{ where } d \in [1, M]; k \in [1, NB_d].$$

RS represents an association degree array, and determines an association degree between a middle-layer feature of the pedestrian attribute a and a bin. In the foregoing formula, d represents a middle-layer feature diagram of a pedestrian attribute, k represents a bin, and N represents a total quantity of sample pictures input in training; M is equal to a total quantity of middle-layer feature diagrams of the pedestrian attribute, and also represents a total quantity of pyramids of the flexible spatial pyramid pooling layer; NB represents a total quantity of containers in the pyramid; Score represents an output value (namely, a feature vector) of a bin in the sample picture; and Label represents a label vector of the pedestrian attribute a in the sample picture, where Label of the positive sample picture is 1, and Label of the negative sample picture is 0.

After the association degree between a middle-layer feature of a pedestrian attribute and a bin is determined, when an attribute a of a to-be-detected image needs to be positioned, the following processing may be performed.

First, the association degree needs to be normalized, and a weight value w of a middle-layer feature diagram of a pedestrian attribute for a bin is obtained based on a received high-dimensional feature vector (which is directly related to score):

$$w[d][k] = \frac{score[d][k] \times \text{norm\_score}[d][k] \times RS[d][k]}{\sum_{i=1}^{M} score[d][i] \times \text{norm\_score}[d][k] \times RS[d][i]},$$

where
a regularization score norm_score is:

norm_score[d][k]=score[d][k]/(pred$_a$[d][k]?PAve[d][k]:NAve[d][k]); where pred represents an identification value of the attribute a.
When the identification value of the attribute a is 1, norm_score[d][k]=score[d][k]/PAve[d][k]; or
when the identification value of the attribute a is 0, norm_score[d][k]=score[d][k]/NAve[d][k].

Second, based on the received middle-layer feature diagram of the pedestrian attribute a, an attribute possibility distribution diagram D is obtained by superimposing the middle-layer feature diagrams on which weighting is performed based on the weight value after blurring processing is performed by a Gaussian filter:

$D=D+w[d][k] \times \text{Resize}(A[d] \times \text{mask}(H_{img}, W_{img}))$, where $d \in [1,M], k \in [1, NB_1]$.

W and H represent a size of the middle-layer feature diagram; Resize represents that the size of the obtained image is adjusted; and A represents the middle-layer feature diagram of the pedestrian attribute. A Gaussian mask function used for blurring processing is as follows:

mask=Gauss(($W_{fmap}[d], H_{fmap}[d]$),($X[d][k], Y[d][k]$), var).

The mask function is defined as:

$$\text{mask}[i][j] = \exp\left(-\frac{(i - y[d][k])^2 + (j - x[d][k])^2}{2 \times \text{var}}\right),$$

$i \in [1, H_{fmap}[d]], j \in [1, W_{fmap}[d]]$;

where
X and Y represent coordinates of a maximum value point of the detected middle-layer feature diagram, and var is specifically:

$$\text{var} = \frac{W_{img} \times H_{img}}{W_{fmap}[d] \times H_{fmap}[d]}.$$

The attribute possibility distribution diagram D that is obtained in the foregoing process represents distribution of response values of the pedestrian attribute in the to-be-detected image. Therefore, on the attribute possibility distribution diagram D, an active area range in which the response value is higher than a threshold (the threshold may be preset according to a requirement) represents a general outline of the pedestrian attribute.

Then, to further accurately position the pedestrian attribute, clustering processing needs to be performed on these active area ranges, to obtain one or more active clusters, so that a central point of the active cluster is determined, and the central point is selected as an indication point of a pedestrian attribute location.

In a specific embodiment, a quantity of location indication points of the pedestrian attribute of a pedestrian may be predetermined empirically, so that active clusters can be sorted based on average response values of corresponding active clusters, and finally the same quantity of active clusters as the pedestrian attributes are retained. For example, for a pedestrian attribute "wearing a hat", a maximum quantity of hats of each pedestrian is predefined as one. Therefore, in related calculation for positioning the pedestrian attribute "wearing a hat", if there are a plurality of determined active clusters, an average response value of each active cluster is calculated, an active cluster with a largest average response value is determined, and a central point of the active cluster is a location indication point of the pedestrian attribute "wearing a hat". For another example, for a pedestrian attribute "gloves", a quantity of gloves of each pedestrian is predefined as two. Therefore, in related calculation for positioning the pedestrian attribute "wearing gloves", if there are a plurality of determined active clusters, average response values of the active clusters are calculated, the active clusters are sorted in descending order of the average response values, and first two active clusters with largest average response values in the sequence are retained, and central points of the two active clusters are location indication points of the pedestrian attribute "wearing gloves".

It should be noted that a quantity of active clusters may also be set based on another factor different from the quantity of location indication points of the pedestrian attribute, for example, a pedestrian attribute "shirt" or a pedestrian attribute "trousers". In practice, it is found that average response values of the first two active clusters in the active cluster sequence are usually considerably greater than those of the remaining active clusters. Therefore, a quantity of cluster centers for these attributes may be set to two.

Finally, the pedestrian attribute is marked in the location indication point in the to-be-detected image, so that a user can directly find an accurate location of the pedestrian attribute in the to-be-detected image. The pedestrian attribute may be marked in various manners. For example, the pedestrian attribute may be marked by setting a pattern such as a cross or a highlighted box at the location indication point, which is not limited herein in the present invention.

Figure 5:
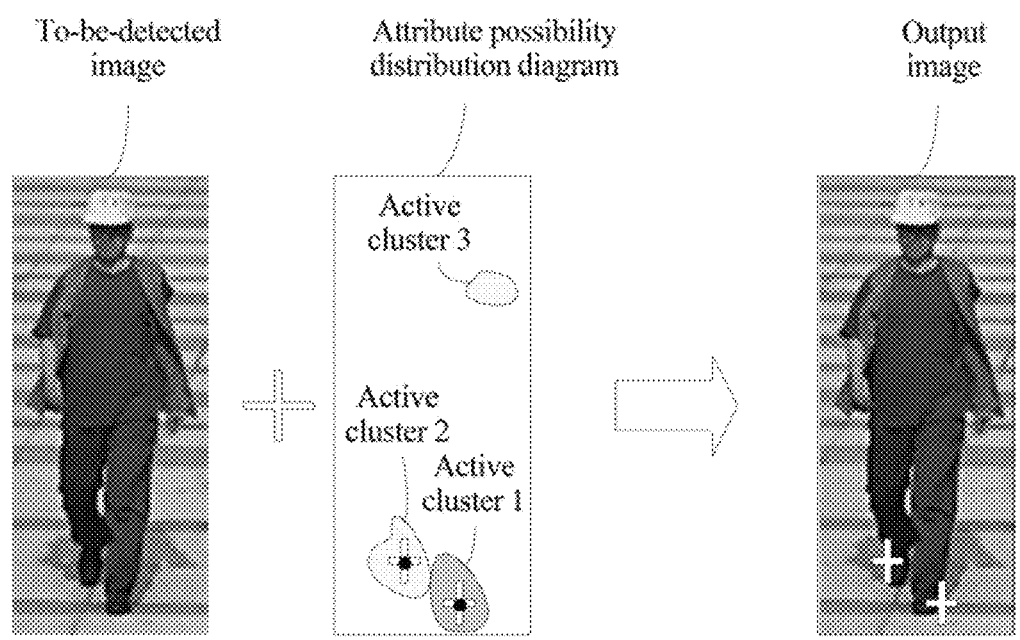
FIG. 5 is a scenario diagram of an example of positioning one pedestrian attribute according to an embodiment of the present invention.

Referring to FIG. 5, in a specific application scenario, a pedestrian attribute needed to be positioned is "shoes". Through related calculation of the attribute positioning module, an attribute possibility distribution diagram is obtained. A part whose response value is higher than a threshold is retained. After clustering processing, an active cluster 1, an active cluster 2, and an active cluster 3 are obtained. Because a response value of the active cluster 1>a response value of the active cluster 2>a response value of the active cluster 3, the active cluster 1 and the active cluster 2 are retained. Highlighted cross patterns are marked on central points of the active cluster 1 and the active cluster 2. With reference to the processed attribute possibility distribution diagram and the to-be-detected image, the pedestrian attribute "shoes" can be positioned in the image, and a related image is output.

Figure 6:
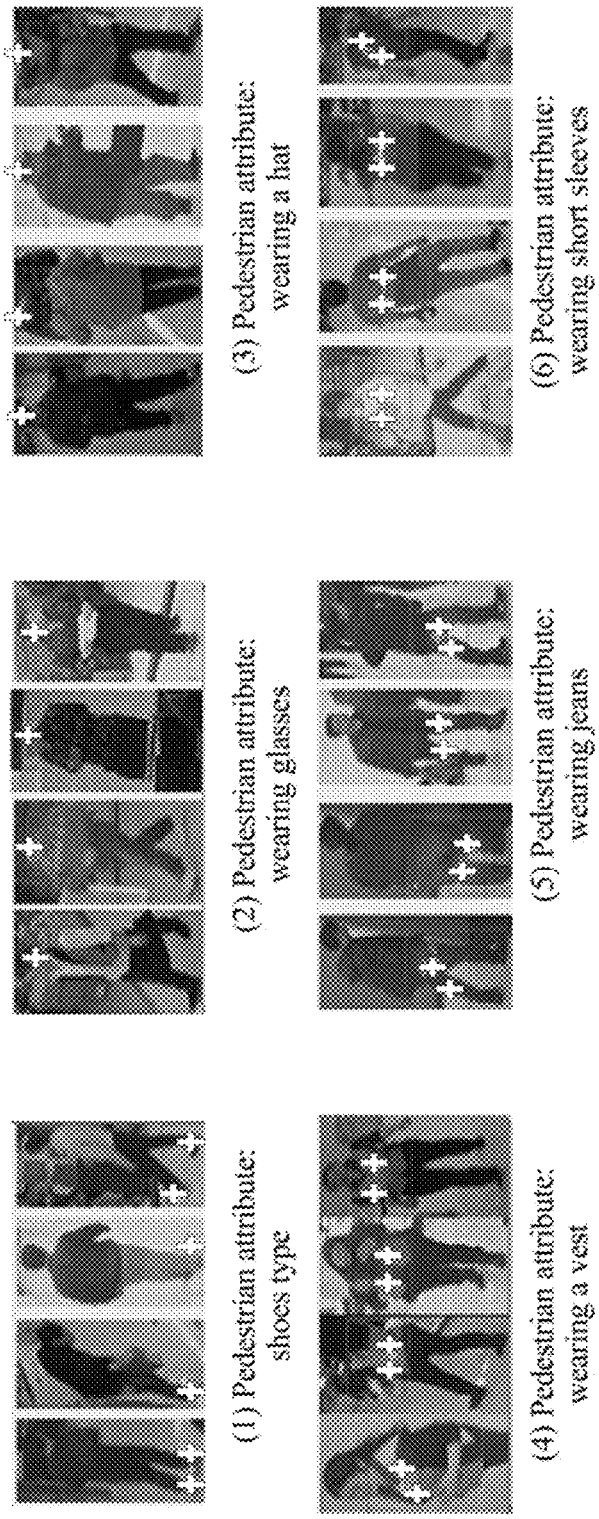
FIG. 6 is a scenario diagram of an example of identifying and positioning a plurality of pedestrian attributes according to an embodiment of the present invention.

FIG. 6 shows an example of pedestrian attribute identification and positioning results obtained in a plurality of surveillance scenarios according to an embodiment of the present invention. The identification results of the pedestrian attributes provided in the example include identification of pedestrian attributes such as "shoes type", "wearing glasses", "wearing a hat", "wearing a vest", "wearing jeans", and "wearing short sleeves", and the identification results are relatively accurate. In addition, positioning is performed on the pedestrian attributes such as "shoes type", "wearing glasses", "wearing a hat", "wearing a vest", "wearing jeans", and "wearing short sleeves" in the images. Positioning results are marked with highlighted cross patterns. It can be seen that the positioning results of these pedestrian attributes are also relatively accurate.

It can be learned that, in this embodiment of the present invention, to better adapt to a task of simultaneously performing pedestrian attribute identification and positioning, the multi-scale perception module in an intermediate process of the convolutional neural network system focuses more on a middle-layer feature of the pedestrian attribute instead of the attribute itself. The attribute identification module performs pedestrian attribute identification based on a related feature vector of the middle-layer feature, and can well identify a fine-granularity attribute feature such as "wearing glasses" in a video surveillance scenario. The attribute positioning module may perform pedestrian attribute positioning based on the middle-layer feature diagram and the related feature vector of the middle-layer feature, and can implement relatively accurate identification and positioning in the video surveillance scenario, thereby making up a disadvantage of an attribute positioning method in a surveillance scenario in the prior art.

Figure 7:
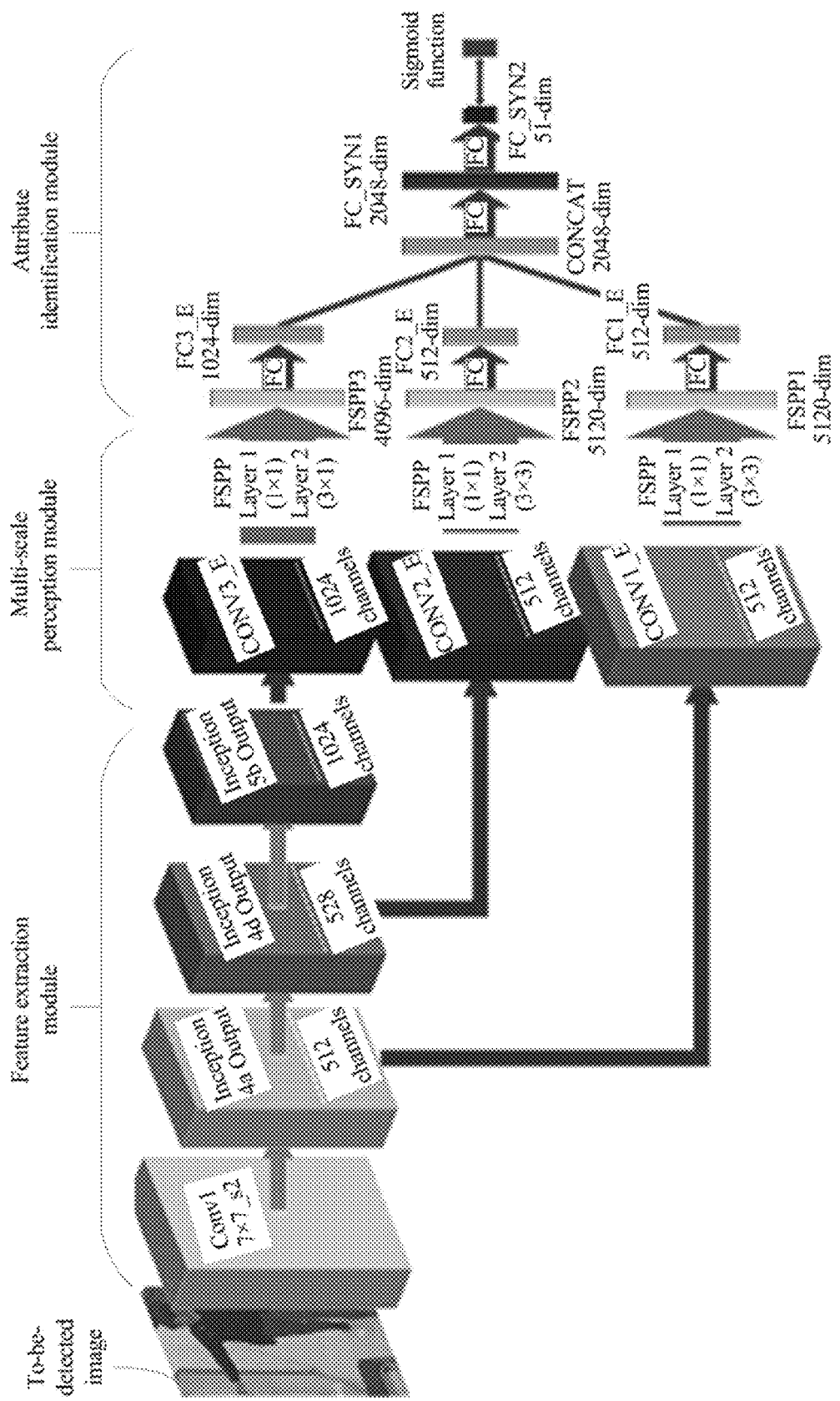
FIG. 7 is a schematic structural diagram of another convolutional neural network system according to an embodiment of the present invention.

The following describes a specific implementation of a convolutional neural network system provided in the embodiments of the present invention by using an example. Referring to FIG. 7, in this implementation, a feature extraction module of the convolutional neural network system based on weakly supervised training uses an inception architecture of a GoogLeNet model as a feature engine, to extract general features of a pedestrian attribute of a to-be-detected image at Inception4a/output, Inception4d/output, and Inception5b/output, and input the general features to three convolution layers of a multi-scale perception module: CONV1_E, CONV2_E, and CONV3_E. The three convolution layers respectively have 512, 512, and 1024 groups of convolution kernels, that is, respectively correspond to 512, 512, and 1024 channels. Each group of convolution kernels is configured to convert a general feature of the pedestrian attribute into a middle-layer feature of the pedestrian attribute, and input the middle-layer feature of the pedestrian attribute to a corresponding FSPP layer through a corresponding channel. To reduce a calculation amount, a pyramid is limited to two layers. An FSPP layer corresponding to the CONV1_E includes a layer of 1×1 bin and a layer of 3×3 bins that overlap each other; an FSPP layer corresponding to the CONV2_E includes a layer of 1×1 bin and a layer of 3×3 bins that overlap each other; and an FSPP layer corresponding to the CONV3_E includes a layer of 1×1 bin and a layer of 3×1 bins that overlap each other. A middle-layer feature diagram of each channel is processed, at a corresponding FSPP layer, into a small vector (a feature vector) whose dimension quantity is equal to a total quantity of bins at the FSPP layer, and finally high-dimensional feature vectors that are respectively a 5120-dimension feature vector, a 5120-dimension feature vector, and a 4096-dimension feature vector of the three branches are formed, and are input to a fully connected (FC) layer of an attribute identification module. Finally, these high-dimensional feature vectors are integrated into a 2048-dimension high-dimensional vector in a preset classification processing manner. Classification processing and dimension reduction are further performed on the 2048-dimension high-dimensional vector, to regress the 2048-dimension high-dimensional vector into a 51-dimension low-dimensional vector. In other words, 51 types of pedestrian attributes are preset. According to a sigmoid function, the low-dimensional vector is normalized to an interval [0, 1], and an output prediction result is an identification result of a pedestrian attribute. In addition, in this embodiment of the present invention, the multi-scale perception module sends the middle-layer feature diagrams of the pedestrian attribute and the high-dimensional feature vectors of the three branches to an attribute positioning module (not shown in the figure), to obtain and output a positioning result of the pedestrian attribute. For details, refer to related description of the foregoing attribute positioning module.

It can be learned that in this embodiment of the present invention, a size and a length-width ratio of a to-be-detected image at an input end are not limited, and a feature map of any size may be changed, through an operation at the FSPP layer, to a high-dimensional feature vector of a fixed size that can be accepted by the FC layer. Therefore, in this embodiment of the present invention, an input picture of any size and any resolution can be processed without being distorted or deformed. This helps preserve an original shape feature of a pedestrian body and an appendage, and facilitates actual application in a video surveillance system.

The following describes the weakly supervised training in the embodiments of the present invention. In this embodiment of the present invention, the convolutional neural network system performs training by using a weak supervision method. When the training needs to be performed, a sample picture (including a positive sample picture and a negative sample picture) that is input to a database only needs to include a truth label about whether a pedestrian attribute exists. In this way, the convolutional neural network system can be trained without having to perform border marking (or positioning marking) of the pedestrian attribute in the picture. For example, pedestrian attributes are classified into five types in advance: A, B, C, D, and E. For any pedestrian attribute, if the pedestrian attribute exists in the sample picture, the truth label is 1; or if the pedestrian attribute does not exist in the sample picture, the truth label is 0. For example, for an attribute A, a possible label vector of a positive sample picture is "11010", and a possible label vector of a negative sample picture is "01010".

In this embodiment of the present invention, the convolutional neural network system can constantly and automatically adjust some parameter settings through the weakly supervised training by using a large quantity of sample pictures, so that an identification result and a positioning result of the pedestrian attribute become more accurate. The parameter settings that can be automatically adjusted may also be referred to as parameters obtained through the weakly supervised training. The parameters obtained through the weakly supervised training include, for example, each group of convolution kernels (a convolution matrix) of a convolution layer, a pooling matrix of a pooling layer, an association degree value RS between a middle-layer feature of an attribute and a bin, and an association degree between a middle-layer feature and an attribute. These parameters are determined and corrected through a lot of automatic learning.

For example, the convolutional neural network system can automatically learn a middle-layer feature and a pedestrian attribute between which there is a higher association degree, and can also automatically learn a bin of a larger weight for a middle-layer feature of a pedestrian attribute. In an initial stage, the convolutional neural network system does not know these association degrees or bin weights. In each training cycle, the convolutional neural network system transfers, based on the truth label of the sample picture by using a back propagation function, gradients from a prediction layer of an attribute back to a multi-scale perception module and a feature extraction module through an FC layer. These gradients are directly related to an existence label of the middle-layer feature. The FC layer pre-codes a positive correlation or a negative correlation between a middle-layer feature and an attribute, so that a middle-layer feature that is in a positive correlation with the attribute can be determined. When the pedestrian attribute in the sample picture is marked as "existent", a gradient related to a corresponding middle-layer feature is transmitted to a related bin that outputs the feature, thereby increasing a response degree of the related bin to the middle-layer feature. The gradient is transmitted to a convolution layer of the multi-scale perception module, and a convolution matrix of each convolution layer is adjusted, to encourage the related convolution layer to extract the middle-layer feature. The gradient is transmitted to the feature extraction module, and a convolution matrix and a pooling matrix of each layer of the feature extraction module may be further adjusted, to encourage the feature extraction module to extract a general feature that is in a positive correlation with the attribute. In addition, in the foregoing process, a feature response that is in a negative correlation with the attribute is suppressed. It may be understood that when the pedestrian attribute in the sample picture is marked as "nonexistent", existence of the middle-layer feature of the attribute is to be suppressed.

For example, for some sample pictures, if a pedestrian wears a hat, for the pedestrian attribute "wearing a hat", when a middle-layer feature is determined to be in a positive correlation with the attribute "wearing a hat", a weight of a bin in the upper part of the FSPP layer (such as a second layer) is usually increased, and feature extraction related to the middle-layer feature is also enhanced.

For another example, for some sample pictures, if a pedestrian wears shoes, for the pedestrian attribute "wearing shoes", when a middle-layer feature is determined to be in a positive correlation with the attribute "wearing shoes", a weight of a bin in the lower part of the FSPP layer is usually increased, and feature extraction related to the middle-layer feature is also enhanced.

For another example, for some training samples, there is a middle-layer feature that may appear in any part of the picture. Because a global max pooling operation may be performed on a first layer (1×1 bin) of the FSPP layer, a weight of the bin is increased for the middle-layer feature.

For another example, for some training samples, a hat is not on the head of a pedestrian, but the hat appears in other content of the image (for example, on a shelf). In this case, a weight of a bin corresponding to the pedestrian image does not change, but a weight of a bin corresponding to a high-response location that includes the feature (that is, a bin related to a shelf location) is weakened, and a correlation between the related bin and an attribute is suppressed.

For another example, the convolutional neural network system can automatically learn that a middle-layer feature may be shared by a plurality of pedestrian attributes, that is, a middle-layer feature is associated with the plurality of pedestrian attributes, and there is also a correlation between different association degrees RSs. In this case, the convolutional neural network system increases related response during training, so that final identification and positioning results conform to the pedestrian attribute. For example, a middle-layer feature may be associated with both two pedestrian attributes: "wearing a dress" and "woman". In this case, in a process in which a system performs image identification and positioning on the pedestrian attribute "wearing a dress", a parameter that is obtained through the weakly supervised training and that is related to a female feature is increased, so that an output result is more inclined to the female feature. For another example, when some attribute features in video surveillance are blocked by obstacles, the convolutional neural network system may also perform corresponding pedestrian attribute identification and positioning based on the learned association between a middle-layer feature and a plurality of pedestrian attributes.

It can be learned that in this embodiment of the present invention, a weakly supervised training method based on a truth label achieves relatively high efficiency in processing a sample picture, and can reduce human and material costs. The convolutional neural network based on the weakly supervised training can be applied to a video surveillance scenario to accurately identify and position a fine-granularity attribute feature of a pedestrian, can be adapted to a plurality of application scenarios such as low resolution, a large angle of view difference, and environment occlusion in the video surveillance, and achieve a higher robustness and a better effect in pedestrian attribute identification, thereby filling the blank of a pedestrian attribute positioning method in a surveillance scenario.

Figure 8:
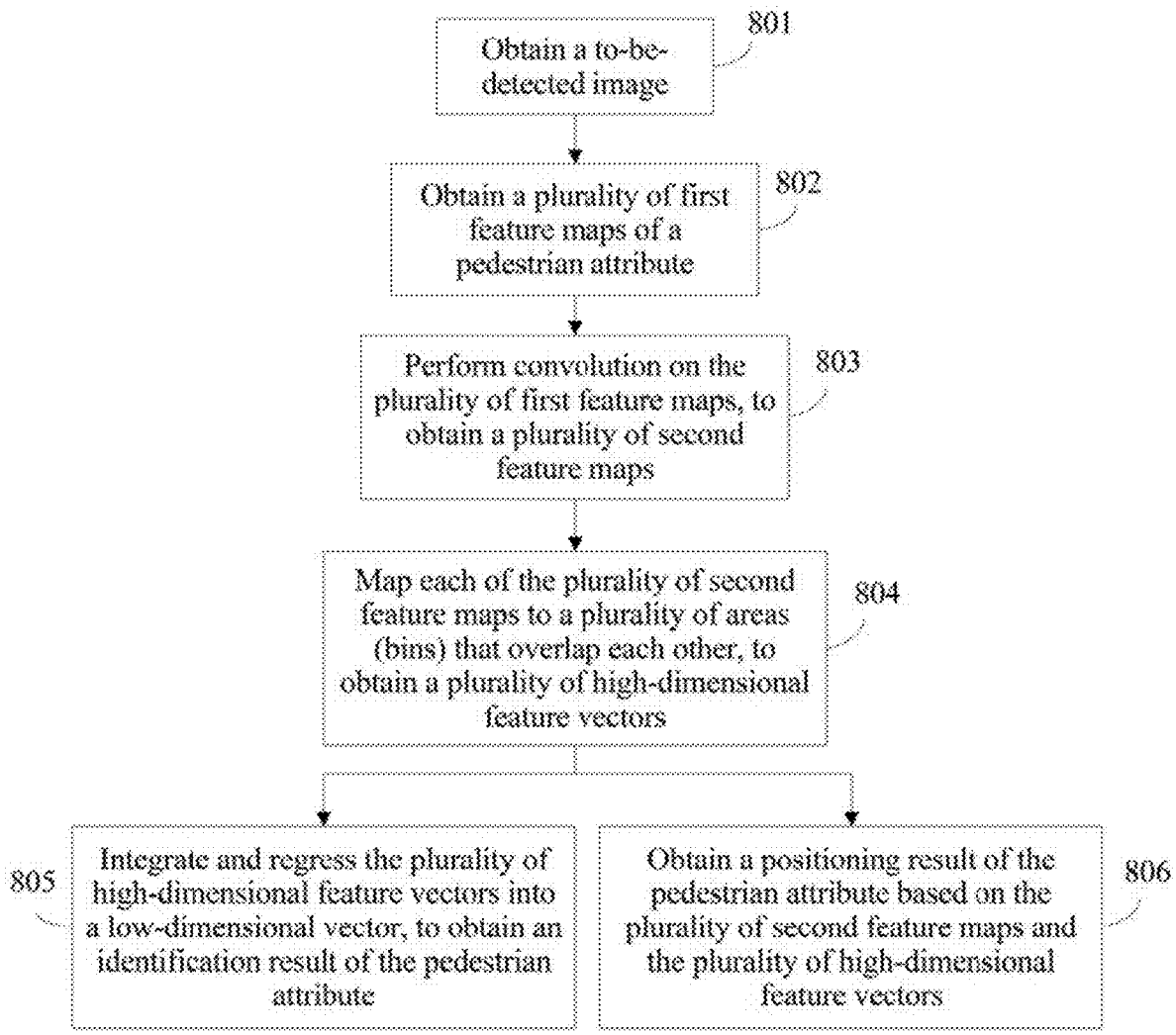
FIG. 8 is a schematic flowchart of a pedestrian attribute identification and positioning method according to an embodiment of the present invention.

Based on the foregoing convolutional neural network system provided in this embodiment of the present invention, the following describes a pedestrian attribute identification and positioning method according to an embodiment of the present invention. Referring to FIG. 8, the method includes but is not limited to the following steps.

Step S801: Obtain a to-be-detected image.

In this embodiment of the present invention, the to-be-detected image may be an image frame in video surveillance, and the image frame may be a picture of any size and length-width ratio.

Step S802: Perform feature extraction on the to-be-detected image at a plurality of different abstraction degrees, to obtain a plurality of first feature maps of a pedestrian attribute.

In this embodiment of the present invention, abstraction at different degrees may be implemented on the to-be-detected image by using different combinations of convolution layers and pooling layers. To be specific, some shallow-layer combinations have a low image abstraction degree, and a fine-granularity feature in the image is retained; and some deep-layer combinations have a high abstraction degree, and a coarse-granularity feature in the image is retained.

Through feature extraction at the plurality of different abstraction degrees, first feature maps of different abstraction degrees and different scales can be obtained. These first feature maps may be referred to as general features of the pedestrian attribute (or referred to as general feature diagrams of the pedestrian attribute).

It can be learned that in this embodiment of the present invention, extraction with different scales and different abstraction degrees is performed on an attribute feature at different layers, which can ensure that a fine-granularity attribute feature is retained at an earlier stage, thereby avoiding a problem that a small-scale and low-layer feature is lost or eliminated due to a plurality of operations of alternating a convolution operation and a pooling operation at a feature extraction stage.

It should be noted that for a specific implementation of this embodiment of the present invention, reference may be made to related description of the feature extraction module in the embodiment shown in FIG. 2.

Step S803: Perform convolution on the plurality of first feature maps, to obtain a plurality of second feature maps.

In this embodiment of the present invention, to better identify and position a pedestrian attribute, a solution implementation process focuses more on a middle-layer feature of the pedestrian attribute instead of the attribute itself. Therefore, after the first feature maps of different scales and different abstraction degrees are obtained, convolution is further performed on the first feature maps of different scales and different abstraction degrees, to obtain second feature maps. The second feature map may be referred to as a middle-layer feature of the pedestrian attribute (or referred to as a middle-layer feature diagram of the pedestrian attribute). The middle-layer feature of the pedestrian attribute can be used in not only the following pedestrian attribute identification process but also the following pedestrian attribute positioning process, so as to simultaneously perform pedestrian attribute identification and pedestrian attribute positioning.

It should be noted that for a specific implementation of this embodiment of the present invention, reference may be made to related description of the convolution layer of the multi-scale perception module in the embodiment shown in FIG. 2, and details are not described herein.

Step S804: Map each of the plurality of second feature maps to a plurality of areas (bins) that overlap each other, and perform max pooling on each bin, to obtain a plurality of high-dimensional feature vectors, where the bins that overlap each other evenly and completely cover the second feature map.

Specifically, an input feature map is divided into several areas (bins) in a different manner at each layer. These bins at each layer overlap each other. Some pixels in the feature map may be located in different bins at the same time. Sizes of these bins are the same, and these bins can exactly cover the entire feature map through overlapping. Max pooling processing is performed on each bin, to obtain a small vector (namely, a feature vector), where the feature vector represents a response value of the bin to the feature map. Integrating all obtained feature vectors can obtain a plurality of high-dimensional feature vectors.

It can be learned that in this embodiment of the present invention, output of a feature vector related to an attribute feature is adjusted by using a flexible bin size and a bin combination, so as to enhance sensitivity of different bins to different middle-layer features, and clearly determine association degrees between an attribute and different bins. In addition, because the bins overlap each other, a middle-layer feature located in an overlapping area may belong to a plurality of bins at the same time, so that the middle-layer feature can be associated with the plurality of bins, and a positioning response area is extended, thereby helping implement more accurate positioning in the subsequent step.

It should be noted that for a specific implementation of this embodiment of the present invention, reference may be made to related description of the flexible spatial pyramid pooling FSPP layer of the multi-scale perception module in the embodiment shown in FIG. 2, and details are not described herein.

Step S805: Integrate and regress the plurality of high-dimensional feature vectors into a low-dimensional vector, to obtain an identification result of the pedestrian attribute.

Specifically, integration processing and regression processing are performed on the plurality of high-dimensional feature vectors, to obtain a low-dimensional vector whose dimension quantity is the same as the quantity of required attribute classes. The low-dimensional vector is normalized to an interval [0, 1]. A prediction result with a relatively large value in this interval is an identification result of the pedestrian attribute.

It should be noted that for a specific implementation of this embodiment of the present invention, reference may be made to related description of the attribute identification module in the embodiment shown in FIG. 2, and details are not described herein.

Step S806: Obtain a positioning result of the pedestrian attribute based on the plurality of second feature maps and the plurality of high-dimensional feature vectors.

Specifically, an association degree between a pedestrian attribute and each bin may be predetermined through weakly supervised training, and a weight value of each second feature map in each bin is obtained based on the association degree and the plurality of high-dimensional feature vectors; a plurality of second feature maps on which weighting is performed by using the weight value are superimposed, to obtain an attribute possibility distribution diagram, where the attribute possibility distribution diagram represents distribution of response values of the pedestrian attribute in the to-be-detected image; and an area range in which the response value is greater than a threshold in the attribute possibility distribution diagram is obtained, clustering processing is performed on the area range, to obtain an active cluster, and the positioning result of the pedestrian attribute is obtained based on the active cluster.

After the positioning result is obtained, the method further includes: marking the pedestrian attribute in the to-be-detected image based on the positioning result.

It should be noted that for a specific implementation of this embodiment of the present invention, reference may be made to related description of the attribute positioning module in the embodiment shown in FIG. 2, and details are not described herein.

Figure 9:
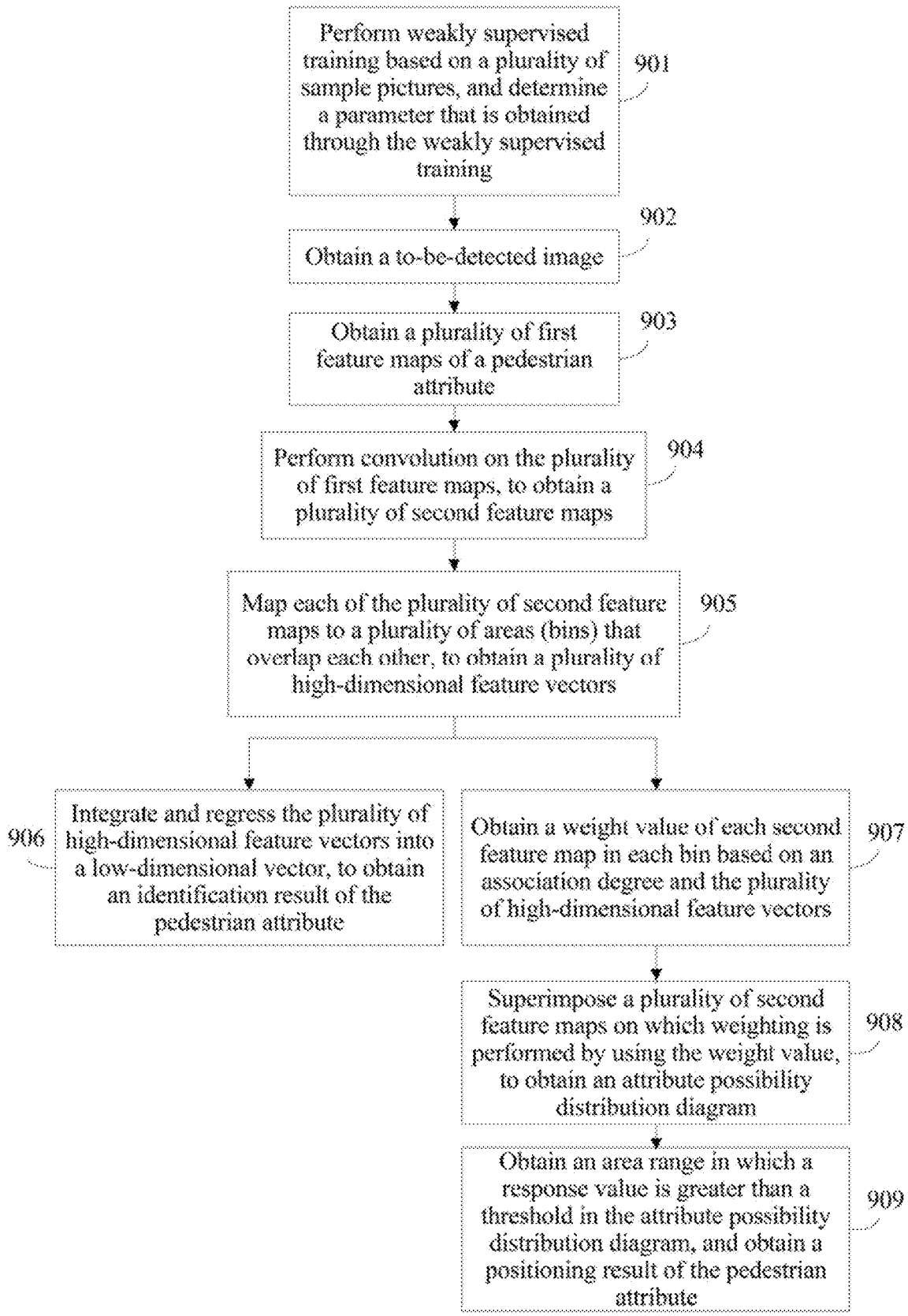
FIG. 9 is a schematic flowchart of another pedestrian attribute identification and positioning method according to an embodiment of the present invention.

The following describes another pedestrian attribute identification and positioning method based on the foregoing convolutional neural network system according to an embodiment of the present invention. Referring to FIG. 9, the method includes but is not limited to the following steps.

Step S901: Perform weakly supervised training based on a plurality of sample pictures, and determine a parameter obtained through the weakly supervised training.

In this embodiment of the present invention, the convolutional neural network system performs training by using a weak supervision method. When the training needs to be performed, a sample picture (including a positive sample picture and a negative sample picture) that is input to a database only needs to include a truth label about whether a pedestrian attribute exists. In this way, the convolutional neural network system can be trained without having to perform border marking of the pedestrian attribute in the picture.

Some parameter settings can be constantly and automatically adjusted through weakly supervised training by using a large quantity of sample pictures, so that an identification result and a positioning result of the pedestrian attribute become more accurate. The parameter settings that can be automatically adjusted may also be referred to as parameters obtained through the weakly supervised training. The parameters obtained through the weakly supervised training include, for example, a convolution matrix of a convolution layer, a pooling matrix of a pooling layer, an association degree RS between a middle-layer feature of an attribute and a bin, and an association degree between a middle-layer feature and an attribute. These parameters are determined and corrected through a lot of automatic learning. After the parameters obtained through the weakly supervised training are determined, in actual application, subsequent steps of the method are performed.

It should be noted that for a specific implementation of this embodiment of the present invention, reference may be made to specific description related to the weakly supervised training of the convolutional neural network system, and details are not described herein.

Step S902: Obtain a to-be-detected image. In this embodiment of the present invention, the to-be-detected image may be an image frame in video surveillance, and the image frame may be an RGB picture of any size and length-width ratio.

Step S903: Perform feature extraction on the to-be-detected image at a plurality of different abstraction degrees, to obtain a plurality of first feature maps of a pedestrian attribute.

Through feature extraction at the plurality of different abstraction degrees, first feature maps of different abstraction degrees and different scales can be obtained. These first feature maps may be referred to as general features of the pedestrian attribute (or referred to as general feature diagrams of the pedestrian attribute). For example, an inception architecture of a GoogLeNet model may be used as a feature engine, to extract general features of the pedestrian attribute of the to-be-detected image at Inception4a/output, Inception4d/output, and Inception5b/output.

It should be noted that for a specific implementation of this embodiment of the present invention, reference may be made to related description of the feature extraction module in the embodiment shown in FIG. 2, and details are not described herein.

Step S904: Perform convolution on the plurality of first feature maps, to obtain a plurality of second feature maps. The second feature map may be referred to as a middle-layer feature of the pedestrian attribute (or referred to as a middle-layer feature diagram of the pedestrian attribute). The middle-layer feature of the pedestrian attribute can be used in not only the following pedestrian attribute identification process but also the following pedestrian attribute positioning process, so as to simultaneously perform pedestrian attribute identification and pedestrian attribute positioning.

It should be noted that for a specific implementation of this embodiment of the present invention, reference may be made to related description of the convolution layer of the multi-scale perception module in the embodiment shown in FIG. 2, and details are not described herein.

Step S905: Map each of the plurality of second feature maps to a plurality of areas (bins) that overlap each other, and perform max pooling on each bin, to obtain a plurality of high-dimensional feature vectors. The bins that overlap each other evenly and completely cover the second feature map.

For example, in a specific application scenario, a two-layer pyramid is designed. A first layer of the pyramid includes one bin. The one bin covers an entire middle-layer feature diagram. A max pooling operation is performed on the bin, that is, a global max pooling operation is performed on the input middle-layer feature diagram, to obtain a feature vector. At a second layer, a middle-layer feature diagram of an attribute is covered by 3×1 bins or 3×3 bins. These bins spatially overlap each other, are distributed evenly, and cover the entire middle-layer feature diagram. The max pooling operation is separately performed on these bins, that is, the max pooling operation is separately performed on areas in the input middle-layer feature diagram that are in a one-to-one correspondence with the nine bins, to obtain a plurality of feature vectors. Therefore, all the foregoing feature vectors are integrated, to obtain a high-dimensional feature vector group.

It should be noted that for a specific implementation of this embodiment of the present invention, reference may be made to related description of the flexible spatial pyramid pooling FSPP layer of the multi-scale perception module in the embodiment shown in FIG. 2, and details are not described herein.

Step S906: Integrate and regress the plurality of high-dimensional feature vectors into a low-dimensional vector, to obtain an identification result of the pedestrian attribute. It should be noted that for a specific implementation of this embodiment of the present invention, reference may be made to related description of the attribute identification module in the embodiment shown in FIG. 2, and details are not described herein.

Step S907: Obtain a weight value of each second feature map in each bin based on the association degree and the plurality of high-dimensional feature vectors.

Specifically, in a process of performing the weakly supervised training by using a large quantity of pictures, the pictures input to the convolutional neural network system include a large quantity of positive sample pictures and negative sample pictures. The positive sample picture is a picture having a relatively high association with the pedestrian attribute, and the negative sample picture is a picture having a relatively low association with the pedestrian attribute. Determining the association degree between a middle-layer feature of the pedestrian attribute and a bin is to determine a ratio of an average response value of a bin in the positive sample picture to an average response value of the bin in the negative sample picture.

Step S908: Superimpose a plurality of second feature maps on which weighting is performed by using the weight value, to obtain an attribute possibility distribution diagram.

Specifically, based on the received middle-layer feature diagram of the pedestrian attribute, the attribute possibility distribution diagram is obtained by superimposing the middle-layer feature diagrams on which weighting is performed based on the weight value after blurring processing is performed by a Gaussian filter. The attribute possibility distribution diagram represents distribution of response values of the pedestrian attribute in the to-be-detected image.

Step S909: Obtain an area range in which the response value is greater than a threshold in the attribute possibility distribution diagram, perform clustering processing on the area range, to obtain an active cluster, and obtain the positioning result of the pedestrian attribute.

Specifically, when there are a plurality of active clusters, the obtaining the positioning result of the pedestrian attribute based on the active cluster includes: predetermining a quantity of pedestrian attributes in the to-be-detected image; determining an average response value of each active cluster; sorting the plurality of active clusters based on the average response values; and obtaining, based on a sorting result, the same quantity of active clusters as the pedestrian attributes, so as to determine a central point of the active cluster, and select the central point as an indication point of a pedestrian attribute location, where the indication point of the pedestrian attribute location is the positioning result of the pedestrian attribute. Finally, the pedestrian attribute may be marked in the location indication point in the to-be-detected image, so that a user can directly find an accurate location of the pedestrian attribute in the to-be-detected image.

It should be noted that for a specific calculation process of steps S907, S908, and S909, reference may be made to related description of the attribute positioning module in the embodiment shown in FIG. 2, and details are not described herein.

It can be learned that in this embodiment of the present invention, an input picture of any size and any resolution can be processed without being distorted or deformed. This helps preserve an original shape feature of a pedestrian body and an appendage, and facilitates actual application in a video surveillance system. General features of a pedestrian attribute of different abstraction degrees are extracted, so that a fine-granularity attribute feature is retained. After the general features are converted into middle-layer features, pedestrian attribute identification may be performed based on the related feature vector of the middle-layer feature, and a fine-granularity attribute feature (for example "wearing glasses") in a video surveillance scenario can be better identified, achieving a higher robustness and a better effect in pedestrian attribute identification. In addition, the pedestrian attribute positioning may also be performed based on the middle-layer feature diagram and the related feature vector of the middle-layer feature, which can be adapted to a plurality of application scenarios such as low resolution, a large angle of view difference, and environment occlusion in the video surveillance, thereby filling the blank of an attribute positioning method in a surveillance scenario in the prior art. In addition, in this embodiment of the present invention, a weakly supervised training method based on a truth label achieves relatively high efficiency in processing a sample picture, and can effectively reduce human and material costs.

The foregoing describes the convolutional neural network system and the related method according to the embodiments of the present invention. The following describes a related device according to an embodiment of the present invention.

Figure 10:
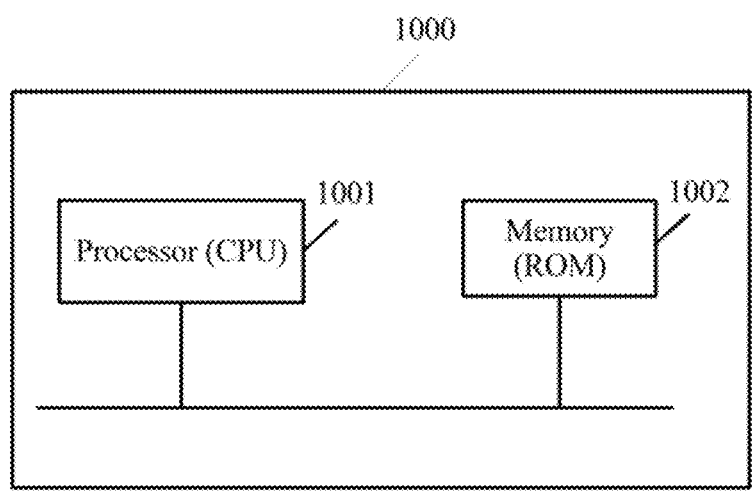
FIG. 10 is a structural diagram of a pedestrian attribute identification and positioning device according to an embodiment of the present invention.

Referring to FIG. 10, this embodiment of the present invention provides a hardware device 1000 for pedestrian attribute identification and positioning. The hardware device 1000 includes a processor 1001 and a memory 1002, and the processor 1001 is connected to the memory 1002 (for example, by using a bus).

The processor 1001 may be one or more central processing units (CPU). When the processor 1001 is one CPU, the CPU may be a single-core CPU, or may be a multi-core CPU.

The memory 1002 includes but is not limited to a random access memory (RAM), a read-only memory (ROM), an erasable programmable read only memory (EPROM), or a compact disc read-only memory (CD-ROM). The memory 1002 is configured to store related program code and data (such as related data of the convolutional neural network system).

The processor 1001 is configured to read the program code stored in the memory 1002, so as to: obtain a to-be-detected image; perform feature extraction on the to-be-detected image at a plurality of different abstraction degrees, to obtain a plurality of first feature maps of a pedestrian attribute; perform convolution on the plurality of first feature maps, to obtain a plurality of second feature maps; map each of the plurality of second feature maps to a plurality of areas (bins) that overlap each other, and perform max pooling on each bin, to obtain a plurality of high-dimensional feature vectors, where the plurality of bins that overlap each other evenly and completely cover each second feature map; integrate and regress the plurality of high-dimensional feature vectors into a low-dimensional vector, to obtain an identification result of the pedestrian attribute; obtain a positioning result of the pedestrian attribute based on the plurality of second feature maps and the plurality of high-dimensional feature vectors; and mark the pedestrian attribute in the to-be-detected image based on the positioning result.

In a specific embodiment, the processor 1001 performs weakly supervised training in advance. The weakly supervised training is training that is performed based on a plurality of sample pictures; and the plurality of sample pictures include a positive sample picture and a negative sample picture, the pedestrian attribute in the positive sample picture is marked as "existent", and the pedestrian attribute in the negative sample picture is marked as "non-existent".

In a specific embodiment, before the to-be-detected image is obtained, the processor 1001 predetermines a plurality of groups of convolution kernels through weakly supervised training. That the processor 1001 performs convolution on the plurality of first feature maps, to obtain a plurality of second feature maps includes: the processor 1001 separately performs convolution on the plurality of first feature maps based on the plurality of groups of convolution kernels, to obtain the plurality of second feature maps.

In a specific embodiment, the processor 1001 further predetermines an association degree value between each second feature map and each bin through the weakly supervised training.

That the processor 1001 obtains a positioning result of the pedestrian attribute based on the plurality of second feature maps and the plurality of high-dimensional feature vectors includes: the processor 1001 obtains a weight value of each second feature map in each bin based on the association degree value and the plurality of high-dimensional feature vectors; superimposes a plurality of second feature maps on which weighting is performed by using the respective weight values, to obtain an attribute possibility distribution diagram, where the attribute possibility distribution diagram represents distribution of response values of the pedestrian attribute in the to-be-detected image; and obtains an area range in which the response value is greater than a threshold in the attribute possibility distribution diagram, performs clustering processing on the area range, to obtain an active cluster, and obtains the positioning result of the pedestrian attribute based on the active cluster.

In a specific embodiment, when there are a plurality of active clusters, that the processor 1001 obtains the positioning result of the pedestrian attribute based on the active cluster includes: the processor 1001 determines a quantity of pedestrian attributes in the to-be-detected image; determines an average response value of each active cluster; sorts the plurality of active clusters based on the average response values; and obtains, based on a sorting result, the same quantity of active clusters as the pedestrian attributes, to obtain the positioning result of the pedestrian attribute.

It should be noted that for related technical features of the processor 1001 and the memory 1002, reference may be made to related content in the embodiments of FIG. 2, FIG. 8, and FIG. 9, and details are not described herein.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or a part of the procedures or functions are generated according to the embodiments of the present invention. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the description of each embodiment has respective focuses. For a part that is not described in detail in an embodiment, refer to related descriptions in other embodiments.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A pedestrian attribute identification and positioning method, applied to a hardware comprising a processor, the method comprising:
    obtaining a to-be-detected image;
    performing feature extraction on the to-be-detected image at a plurality of different abstraction degrees, to obtain a plurality of first feature maps of a pedestrian attribute;
    separately performing convolution on the plurality of first feature maps, to obtain a plurality of second feature maps;

mapping each of the plurality of second feature maps to a plurality of areas including bins that overlap each other, and performing max pooling on each bin, to obtain a plurality of high-dimensional feature vectors, wherein the plurality of bins that overlap each other evenly and completely cover each second feature map;

obtaining a positioning result of the pedestrian attribute based on the plurality of second feature maps and the plurality of high-dimensional feature vectors, comprising:

obtaining a weight value of each second feature map in each bin based on an association degree value and the plurality of high-dimensional feature vectors;

superimposing a plurality of second feature maps on which weighting is performed by using the respective weight values, to obtain an attribute possibility distribution diagram, wherein the attribute possibility distribution diagram represents distribution of response values of the pedestrian attribute in the to-be-detected image; and integrating and regressing the plurality of high-dimensional feature vectors into a low-dimensional vector, to obtain an identification result of the pedestrian attribute.

2. The method according to claim 1, wherein after the plurality of high-dimensional feature vectors are obtained, the method further comprises:

marking the pedestrian attribute in the to-be-detected image based on the positioning result.

3. The method according to claim 1, wherein before the obtaining the to-be-detected image, the method comprises:

predetermining a plurality of groups of convolution kernels through weakly supervised training; and wherein the performing the convolution on the plurality of first feature maps, to obtain the plurality of second feature maps comprises:

separately performing convolution on the plurality of first feature maps based on the plurality of groups of convolution kernels, to obtain the plurality of second feature maps.

4. The method according to claim 3, wherein the association degree value between each second feature map and each bin is further predetermined through the weakly supervised training; and wherein the obtaining a positioning result of the pedestrian attribute based on the plurality of second feature maps and the plurality of high-dimensional feature vectors further comprises:

obtaining an area range in which the response value is greater than a threshold in the attribute possibility distribution diagram, performing clustering processing on the area range, to obtain an active cluster, and obtaining the positioning result of the pedestrian attribute based on the active cluster.

5. The method according to claim 4, further comprising:

determining that there are a plurality of active clusters, in accordance with the determining that there are the plurality of active clusters, the obtaining the positioning result of the pedestrian attribute based on the active cluster comprising:

determining a quantity of pedestrian attributes in the to-be-detected image;

determining an average response value of each active cluster;

sorting the plurality of active clusters based on the average response values; and obtaining, based on a sorting result, the same quantity of active clusters as the pedestrian attributes, to obtain the positioning result of the pedestrian attribute.

6. The method according to claim 3, wherein the weakly supervised training is training that is performed based on a plurality of sample pictures, which comprise a positive sample picture and a negative sample picture, the pedestrian attribute in the positive sample picture is marked as existent, and the pedestrian attribute in the negative sample picture is marked as nonexistent.

7. A convolutional neural network system for pedestrian attribute identification and positioning, the system comprising a hardware including a processor and a memory, both of which are connected by a bus, wherein the memory stores processor-executable instructions which cause the processor to implement operations including:

performing feature extraction on a to-be-detected image at N different abstraction degrees, to obtain N first feature maps of a pedestrian attribute; and respectively send the N first feature maps to N parallel convolution layers by using N branches;

wherein the N parallel convolution layers and N parallel flexible spatial pyramid pooling layers are included in the system, N is a positive integer, and one convolution layer is connected to one flexible spatial pyramid pooling layer;

performing, by using the convolution layer corresponding to each of the N branches, convolution on a first feature map received by a convolution layer, to obtain a second feature map;

mapping, by using a flexible spatial pyramid pooling layer corresponding to each branch, the second feature map received by the flexible spatial pyramid pooling layer to a plurality of areas include bins that overlap each other, and performing max pooling on each bin, to obtain a high-dimensional feature vector, wherein the bins that overlap each other evenly and completely cover the second feature map; and integrating and regressing all high-dimensional feature vectors that are obtained by using the N branches, to obtain a low-dimensional vector, and obtaining an identification result of the pedestrian attribute based on the low-dimensional vector, wherein each convolution layer comprises a plurality of groups of convolution kernels, the flexible spatial pyramid pooling layer comprises a plurality of layers with each layer comprising a plurality of bins with a different quantity, and the plurality of bins at each layer overlap each other and evenly and completely cover the second feature map, and wherein the operation of performing the convolution on the first feature map received by the convolution layer to obtain the second feature map comprises:

performing, by using each group of convolution kernels of each convolution layer, convolution on the received first feature map, to obtain the second feature map; and wherein the operations of mapping the second feature map to the plurality of areas including the bins and performing the max pooling on each bin comprises:

mapping the second feature map that is obtained by using each group of convolution kernels to a plurality of bins with a different quantity; performing max pooling on each bin, to obtain a feature vector corresponding to each group of convolution kernels; and integrating all the feature vectors that are obtained by using the plurality of groups of convolution kernels into a high-dimensional feature vector.

8. The system according to claim 7, wherein the operations further comprise:
obtaining a positioning result of the pedestrian attribute based on all the second feature maps and all the high-dimensional feature vectors that are obtained by using the N branches.

9. The system according to claim 7, wherein the system predetermines each group of convolution kernels through weakly supervised training.

10. The system according to claim 9, wherein the system further predetermines an association degree value between each second feature map and each bin through the weakly supervised training; and
wherein the operations further include:
obtaining a positioning result of the pedestrian attribute based on all the second feature maps and all the high-dimensional feature vectors that are obtained by using the N branches, including:
obtaining a weight value of each second feature map in each bin based on the association degree value and all the high-dimensional feature vectors;
superimposing second feature maps that are obtained by using the N branches and on which weighting is performed by using the respective weight values, to obtain an attribute possibility distribution diagram, and the attribute possibility distribution diagram represents distribution of response values of the pedestrian attribute in the to-be-detected image; and
obtaining an area range in which the response value is greater than a threshold in the attribute possibility distribution diagram, performing clustering processing on the area range, to obtain an active cluster, and obtaining the positioning result of the pedestrian attribute based on the active cluster.

11. The system according to claim 10, wherein the operations further comprise:
determining there are a plurality of active clusters;
in accordance with the determining that there are the plurality of active clusters, the operation of obtaining the positioning result of the pedestrian attribute based on the active cluster including
determining a quantity of pedestrian attributes in the to-be-detected image;
determining an average response value of each active cluster;
sorting the plurality of active clusters based on the average response values; and
obtaining, based on a sorting result, the same quantity of active clusters as the pedestrian attributes, to obtain the positioning result of the pedestrian attribute.

12. The system according to claim 9, wherein the weakly supervised training is performed based on a plurality of sample pictures, which comprise a positive sample picture and a negative sample picture, the pedestrian attribute in the positive sample picture is marked as existent, and the pedestrian attribute in the negative sample picture is marked as nonexistent.

13. A non-transitory computer-readable medium comprising processor-executable instructions to be executed by a processor of a hardware in a pedestrian attribute identification and positioning system, the instructions cause the processor to implement a pedestrian attribute identification and positioning method, the method comprising:
obtaining a to-be-detected image;
performing feature extraction on the to-be-detected image at a plurality of different abstraction degrees, to obtain a plurality of first feature maps of a pedestrian attribute;
separately performing convolution on the plurality of first feature maps, to obtain a plurality of second feature maps;
mapping each of the plurality of second feature maps to a plurality of areas including bins that overlap each other, and performing max pooling on each bin, to obtain a plurality of high-dimensional feature vectors, wherein the plurality of bins that overlap each other evenly and completely cover each second feature map;
obtaining a positioning result of the pedestrian attribute based on the plurality of second feature maps and the plurality of high-dimensional feature vectors, comprising:
obtaining a weight value of each second feature map in each bin based on an association degree value and the plurality of high-dimensional feature vectors;
superimposing a plurality of second feature maps on which weighting is performed by using the respective weight values, to obtain an attribute possibility distribution diagram, wherein the attribute possibility distribution diagram represents distribution of response values of the pedestrian attribute in the to-be-detected image; and
integrating and regressing the plurality of high-dimensional feature vectors into a low-dimensional vector, to obtain an identification result of the pedestrian attribute.

14. The non-transitory computer-readable medium according to claim 13, wherein after the plurality of high-dimensional feature vectors are obtained, the method further comprises:
marking the pedestrian attribute in the to-be-detected image based on the positioning result.

15. The non-transitory computer-readable medium according to claim 13, wherein before the obtaining the to-be-detected image, the method comprises:
predetermining a plurality of groups of convolution kernels through weakly supervised training; and
wherein the performing the convolution on the plurality of first feature maps, to obtain the plurality of second feature maps comprises:
separately performing convolution on the plurality of first feature maps based on the plurality of groups of convolution kernels, to obtain the plurality of second feature maps.

16. The non-transitory computer-readable medium according to claim 15, wherein the association degree value between each second feature map and each bin is further predetermined through the weakly supervised training; and
wherein the obtaining a positioning result of the pedestrian attribute based on the plurality of second feature maps and the plurality of high-dimensional feature vectors comprises:
obtaining an area range in which the response value is greater than a threshold in the attribute possibility distribution diagram, performing clustering processing on the area range, to obtain an active cluster, and obtaining the positioning result of the pedestrian attribute based on the active cluster.

17. The non-transitory computer-readable medium according to claim 16, wherein the method further comprises:
determining that there are a plurality of active clusters, in accordance with the determining that there are the plurality of active clusters, the obtaining the positioning result of the pedestrian attribute based on the active cluster comprising:
- determining a quantity of pedestrian attributes in the to-be-detected image;
- determining an average response value of each active cluster;
- sorting the plurality of active clusters based on the average response values; and
- obtaining, based on a sorting result, the same quantity of active clusters as the pedestrian attributes, to obtain the positioning result of the pedestrian attribute.

18. The non-transitory computer-readable medium according to claim 15, wherein the weakly supervised training is training that is performed based on a plurality of sample pictures, which comprise a positive sample picture and a negative sample picture, the pedestrian attribute in the positive sample picture is marked as existent, and the pedestrian attribute in the negative sample picture is marked as nonexistent.

* * * * *